United States Patent
Krapf et al.

(10) Patent No.: US 10,416,347 B2
(45) Date of Patent: Sep. 17, 2019

(54) LOCATING SYSTEM HAVING A HAND-HELD LOCATING UNIT

(71) Applicant: Robert Bosch GmbH, Stuttgart (DE)

(72) Inventors: Reiner Krapf, Filderstadt (DE); Heiko Sgarz, Leonberg (DE); Jan-Michael Brosi, Leinfelden-Echterdingen (DE); Christian Amann, Stuttgart (DE); Ralph Dammertz, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 15/320,793

(22) PCT Filed: Apr. 22, 2015

(86) PCT No.: PCT/EP2015/058715
§ 371 (c)(1),
(2) Date: Dec. 21, 2016

(87) PCT Pub. No.: WO2015/197221
PCT Pub. Date: Dec. 30, 2015

(65) Prior Publication Data
US 2017/0153349 A1    Jun. 1, 2017

(30) Foreign Application Priority Data

Jun. 25, 2014 (DE) .................. 10 2014 212 131

(51) Int. Cl.
*G06F 1/00* (2006.01)
*G01V 9/00* (2006.01)
(Continued)

(52) U.S. Cl.
CPC .............. *G01V 9/00* (2013.01); *G01C 15/02* (2013.01); *G01V 3/10* (2013.01); *G01V 3/17* (2013.01);
(Continued)

(58) Field of Classification Search
CPC ......... G06F 1/00; G06F 2101/00; G06K 1/00; G06K 2207/00
See application file for complete search history.

(56) References Cited

U.S. PATENT DOCUMENTS 8,164,599 B1 *  4/2012  Kadous ................. G01C 21/20
                                                          345/629
2010/0097212 A1  4/2010  Wingate et al.
(Continued)

FOREIGN PATENT DOCUMENTS

DE  10 2006 000 364 A1  1/2008
DE  20 2010 016 564 U1  3/2011
(Continued)

OTHER PUBLICATIONS

International Search Report corresponding to PCT Application No. PCT/EP2015/058715, dated Sep. 2, 2015 (German and English language document) (9 pages).

*Primary Examiner* — Jermele M Hollington
*Assistant Examiner* — Temilade S Rhodes-Vivour
(74) *Attorney, Agent, or Firm* — Maginot, Moore & Beck LLP

(57) ABSTRACT

The disclosure relates to a locating system, comprising at least one hand-held locating sensor, which is provided for capturing locating data related to objects to be located that are hidden under an examination surface, a position sensor, which is provided for capturing position data, which can be associated with the locating data, and an evaluating unit, which is provided for determining at least two-dimensional map information from the locating data and the position data and providing said at least two-dimensional map information. According to the disclosure, the locating system comprises at least one data source, which is provided for
(Continued)

providing data for the purpose of a modification of the at least two-dimensional map information.

20 Claims, 10 Drawing Sheets

(51) Int. Cl.
| | |
|---|---|
| *G01C 15/02* | (2006.01) |
| *G01V 3/17* | (2006.01) |
| *G01V 3/175* | (2006.01) |
| *G01V 8/00* | (2006.01) |
| *G01V 3/10* | (2006.01) |
| *G06K 9/22* | (2006.01) |
| *G06T 11/60* | (2006.01) |
| *G01V 3/15* | (2006.01) |

(52) U.S. Cl.
CPC ............. *G01V 3/175* (2013.01); *G01V 8/005* (2013.01); *G06K 9/22* (2013.01); *G06T 11/60* (2013.01); *G01V 3/15* (2013.01); *G06F 1/00* (2013.01); *G06F 2101/00* (2013.01); *G06K 2207/00* (2013.01); *G06K 2209/09* (2013.01)

(56) References Cited

U.S. PATENT DOCUMENTS

| | | | | |
|---|---|---|---|---|
| 2011/0243476 | A1* | 10/2011 | Sieracki | .................. G01V 3/15 382/291 |
| 2013/0070068 | A1* | 3/2013 | Garvey, III | ............ G01C 15/00 348/61 |
| 2014/0049429 | A1* | 2/2014 | Bruemmer | ............ G01S 5/0289 342/463 |
| 2014/0166740 | A1* | 6/2014 | Everth | ..................... G01S 5/16 235/375 |

FOREIGN PATENT DOCUMENTS

| | | |
|---|---|---|
| EP | 0 506 605 A1 | 1/1992 |
| JP | 2003-98263 A | 4/2003 |
| JP | 2005-518549 A | 6/2005 |
| JP | 2006-64420 A | 3/2006 |
| JP | 2008-232803 A | 10/2008 |
| JP | 2012-506055 A | 3/2012 |
| WO | 02/073367 A2 | 9/2002 |
| WO | 03/073133 A1 | 9/2003 |

\* cited by examiner

LOCATING SYSTEM HAVING A HAND-HELD LOCATING UNIT

This application is a 35 U.S.C. § 371 National Stage Application of PCT/EP2015/058715, filed on Apr. 22, 2015, which claims the benefit of priority to Serial No. DE 10 2014 212 131.0, filed on Jun. 25, 2014 in Germany, the disclosures of which are incorporated herein by reference in their entirety.

BACKGROUND

There is already a locating system comprising at least one hand-held locating sensor provided for detecting locating data concerning objects to be located concealed below an examination surface, comprising a position sensor provided for detecting position data assignable to the locating data.

SUMMARY

The disclosure proceeds from a locating system comprising at least one hand-held locating sensor provided for detecting locating data concerning objects to be located concealed below an examination surface, comprising a position sensor provided for detecting position data assignable to the locating data.

It is proposed that the locating system comprises at least one evaluation unit provided for determining at least two-dimensional map information from the locating data and the position data and for providing said at least two-dimensional map information.

According to the disclosure, it is possible to realize a hand-held locating unit having a housing that accommodates at least the locating sensor, the position sensor, an evaluation unit and a display unit. Such a hand-held locating unit forms a compact measuring device, in particular a locating measuring device. Advantageously, such a locating unit also has at least one data source.

In one advantageous development, the locating system at least also comprises a data source provided for providing data concerning a modification of the at least two-dimensional map information.

As a result, it is possible to provide map information on which a user can recognize objects to be located particularly simply and intuitively.

It is possible to provide a locating system having high operating convenience which requires little effort in terms of training.

In this context, a "locating sensor" should be understood to mean, in particular, a sensor provided for detecting physical and/or chemical variables, for example an electric and/or magnetic field change or a propagation time change, which allow the presence of an object to be located to be deduced, and for converting them into an electrically evaluatable signal. The locating sensor can be embodied for example as an inductive sensor, an AC sensor, a capacitive sensor and/or be provided for detection by means of electromagnetic radiation. It can be embodied as a 50 hertz sensor, a microwave sensor, a radar sensor, a terahertz sensor, an ultra-high frequency sensor, an x-ray sensor, an infrared sensor or as an NMR sensor. It can also be embodied as a sound sensor, for example an ultrasonic or impact echo sensor, or as a neutron probe.

In this context, "locating data" should be understood to mean, in particular, measurement values of the locating sensor, for example amplitudes, phase angles and/or direction information and/or signal strength data and/or relaxation times.

In this context, "hand-held" should be understood to mean, in particular, provided for a free movement performed by the user, in particular a free two-dimensional movement, over the examination surface, in particular independently of a predefined grid or a predefined track for a movement path. In this context, an "examination surface" should be understood to mean, in particular, the surface of a fixed body, in particular of a part of a building, for example of a wall, of a ceiling or of a floor. It is also conceivable for the examination surface to be embodied as a part of a terrain surface.

In this context, a "position sensor" should be understood to mean, in particular, a sensor provided for converting a field change, a propagation time change and/or phase angle into an electrically evaluatable signal and for detecting and communicating a position of the sensor on the examination surface, relative to an earlier position or in absolute terms, in relation to at least one fixed reference point. The position sensor is embodied for example as an optical or mechanical path length sensor, which detects a movement on the examination surface in an operating state, or as a distance sensor and is provided for a distance measurement with respect to at least one reference point by means of electromagnetic radiation, for example light, in particular laser light, infrared waves or radar waves. The position sensor can furthermore be embodied as an ultrasonic sensor or a barometric sensor or have some other expedient measuring method.

A "reference point" should be understood to mean a point arranged fixedly relative to the examination surface, for example a point defined by a marking element of the locating system or a point at a transition between the examination surface and another surface of the part of the building, for example at an edge formed by a floor and a wall. Furthermore, it is conceivable for the position sensor to be provided for a position determination by means of an external reference, for example stationary transmitters and/or satellites. Alternatively, it is furthermore conceivable for the position sensor to be provided, for a locating process, for detecting position data purely relatively, independently of a reference point on the examination surface.

In this context, an "evaluation unit" should be understood to mean, in particular, a unit provided for assigning the locating data to the position data and for converting the locating data into output values which comprise representation attributes for a pictorial reproduction, such as, for example, a gray-scale value level, a gray-scale value of a gray-scale value profile, a color value level, a color value of a color profile, a brightness level, a brightness value of a brightness profile and/or a saturation level or a saturation value of a saturation profile and/or a pattern and/or symbols. Preferably, the evaluation unit is provided for dynamically adapting scales of the representation attributes, for example depending on a value range for locating data which were detected in a predefinable time window and/or within a spatial area.

"Provided" should be understood to mean, in particular, specifically programmed, designed and/or equipped. The fact that an object is provided for a specific function should be understood to mean, in particular, that the object fulfils and/or performs said specific function in at least one application state and/or operating state.

In this context, "map information" should be understood to mean, in particular, data which contain information about an arrangement of objects to be located at least in two dimensions along which the examination surface extends, and which are assignable to the examination surface, for example on the basis of given and/or definable reference points. Preferably, the map information is provided for a pictorial display that is at least substantially to scale. In this context, a "pictorial" display should be understood to mean, in particular, an optical reproduction of the locating data which, preferably, is to scale and is position-resolved and which is provided for making at least contours of the objects to be located recognizable for the user. Preferably, the pictorial display is provided for interpretation by a human observer and is independent of a threshold-value-based detection process. Preferably, the map information comprises current and stored locating data which have been conditioned for the pictorial display. In principle, it is conceivable for the map information to contain synthetic data such as, for example, a grid, symbols, lines, coloration and/or shading.

In this context, a "data source" should be understood to mean, in particular, an internal or external unit which is provided for providing data for the two-dimensional map information and is embodied for example as a data memory, a data evaluation and/or processing module, a sensor or an interface. In this context, a "modification" should be understood to mean, in particular, a supplementation, refinement, enrichment, for example by means of a preprocessing of data, a fusion with further locating data and/or with semi-synthetic or synthetic data.

Preferably, the locating sensor is embodied as part of a hand-held locating unit which also comprises the position sensor, and the locating unit has a housing which holds and protects the locating sensor and the position sensor.

Furthermore, it is proposed that the locating sensor is embodied such that it is freely movable along the examination surface. As a result, a particularly flexibly usable locating system can be provided and high operating convenience can be achieved. In this context, "freely movable" should be understood to mean, in particular, that the locating sensor is provided for being moved independently of pre-defined tracks and/or guide elements, in particular without mechanical contact and preferably in a free sweeping movement over the examination surface in order to detect objects to be located. Preferably, the locating system is embodied without wheels and is free of rotary elements provided for guiding the locating sensor for a movement along the examination surface and/or for detecting the movement of the locating sensor along the examination surface.

In one advantageous configuration, the evaluation unit is provided for determining and providing the map information in real time. As a result, the user can recognize objects to be located particularly rapidly and reliably and a particularly efficient locating system can be provided. In this context, "real time" should be understood to mean, in particular, that a processing speed of the evaluation unit corresponds to a movement speed by the user, that is to say that the user can directly assign the movement carried out by said user using the locating unit to a change in the map information. The evaluation unit is provided so as always to detect in each case currently communicated locating data and position data and to exclude from processing data that are received between two processing cycles. Preferably, the ordering system gives the user the impression that the display of the locating system reproduces the locating data at least substantially without any delay.

Furthermore, it is proposed that the evaluation unit is provided for determining and providing three-dimensional map information. As a result, a high information density can be achieved, as a result of which the user can be supported particularly well in the interpretation of the map information.

In this context, "three-dimensional map information" should be understood to mean, in particular, two-dimensional map information extended by depth information. A first dimension and a second dimension extend in a plane of the examination surface and/or in a plane arranged tangentially to the examination surface at the position of the locating unit. In this context, "depth information" should be understood to mean, in particular, information which reproduces a distance between the objects to be located and the examination surface and/or an extent of the objects to be located perpendicularly to the examination surface. Preferably, the three-dimensional map information is provided for a reproduction by means of a 3D-enabled display.

Advantageously, the data source comprises a buffer memory at least for the locating data. As a result, the evaluation unit can also condition the locating data of an individual locating sensor to form two-dimensional map information, and the two-dimensional map information can be iteratively improved. In this context, a "buffer memory" should be understood to mean, in particular, an electronic data memory provided for storing and for retrieving at least locating data; in particular, the buffer memory is embodied as a memory that is writable and readable by the evaluation unit. The buffer memory is embodied for example as a RAM component, as an integrated circuit. In one configuration, the buffer memory can be integrated in the evaluation unit, i.e. be embodied for example at least as part of a memory of the evaluation unit. In principle, it is conceivable for the buffer memory to be provided for some other expedient storage method. In principle, it is conceivable for the buffer memory also to be provided for storing and for retrieving a data component of the locating data and/or for storing and for retrieving synthetic data derived from the locating data by the evaluation unit.

Furthermore, it is proposed that the evaluation unit is provided for interpolating and/or extrapolating the locating data. As a result, two-dimensional map information can be provided particularly rapidly. Incorrect measurements can be compensated for and a high quality of the map information can be achieved.

In this context, "interpolating" should be understood to mean, in particular, that the evaluation unit, proceeding from present locating data stored, in particular, in the buffer memory, calculates, by means of an expedient calculation and/or weighting specification, intermediate values which are assignable to points spatially between the present locating data. In this context, "extrapolating" should be understood to mean, in particular, that the evaluation unit, proceeding from present locating data stored, in particular, in the buffer memory, within a spatial area, calculates, by means of an expedient calculation and/or weighting specification, values which are assignable to points spatially outside the area.

In one advantageous configuration, the evaluation unit is provided for updating an area of the map information in the case of a renewed locating of objects to be located which are assigned to the area of the map information. As a result, a high quality of the two-dimensional map information can be achieved. A user can particularly easily improve a locating result in an area that is particularly relevant to said user. A particularly efficient locating process can be achieved. In this context, "updating" should be understood to mean, in particular, that the evaluation unit reads locating data from the buffer memory and updates them by means of current locating data, i.e. defines a new value for the assigned position data by means of an expedient calculation and/or weighting specification from data of the buffer memory and current locating data. In particular, the updating can result in a refinement, i.e. in an improvement of the resolution of the locating data and/or position data. Preferably, the evaluation unit updates the map information in real time. Preferably, the evaluation unit has a data improvement module provided, for example, for compensating for value fluctuations on account of a local constitution of the part of the building and/or for improving a contrast.

Furthermore, it is proposed that the evaluation unit is provided for refining an area of the map information in the case of a renewed locating of objects to be located which are assigned to the area of the map information. It is thus possible to represent the map or the map information more accurately, and in a manner "more finely resolved", if an area is swept over using the measuring device every now and then, for example.

As a result, the user can purposefully examine relevant areas for objects to be located. A particularly efficient locating system can be provided. In this context, "refining" should be understood to mean, in particular, providing further sensor data for the map information, in particular sensor data of different types, and/or fusing sensor data and/or providing synthetic data and/or semisynthetic data for the map information. Preferably, in the case of renewed locating, the evaluation unit increases an information density and/or a spatial resolution and resolves finer details.

Advantageously, the data source is embodied as a further locating sensor. As a result, supplementary or redundant locating data can be detected and a high locating quality can be achieved. The locating system can detect a large number of locating data in a short time, as a result of which a particularly efficient locating process can be achieved. Different features of the objects to be located can be detected and used for classifying the objects to be located. A particularly diverse locating system having high operating convenience can be provided. In this context, a further "locating sensor" should be understood to mean, in particular, a sensor which, analogously to the locating sensor, is provided for detecting physical and/or chemical variables, for example an electric and/or magnetic field change or a propagation time change, which allow the presence of an object to be located to be deduced, and for converting them into an electrically evaluatable signal. The further locating sensor can be embodied for example as an inductive sensor, an AC sensor, a capacitive sensor and/or be provided for detection by means of electromagnetic radiation. It can be embodied as a 50 hertz sensor, a microwave sensor, a radar sensor, a terahertz sensor, an ultra-high frequency sensor, an x-ray sensor, an infrared sensor or as an NMR sensor. It can also be embodied as a sound sensor, for example an ultrasonic or impact echo sensor, or as a neutron probe. In principle, it is conceivable for the two locating sensors to operate according to an identical physical and/or chemical principle, and also for the two locating sensors to be provided for detecting different features of the objects to be located and for forwarding them to the evaluation unit for a display of the features and/or for a classification of the objects to be located. Preferably, the locating sensors are arranged spatially fixedly with respect to one another, for example held in a housing of the locating unit.

In one advantageous configuration, the data source is embodied as a further position sensor. As a result, a redundancy can be achieved, as a result of which position data can be detected particularly reliably. Furthermore, the evaluation unit can recognize a rotation of the locating sensor by means of the position data of the further position sensor and can correspondingly correct the assignment of locating data to position data. A particularly diversely usable locating system can be provided.

In this case, a further "position sensor" should be understood to mean a sensor which, analogously to the position sensor, is provided for detecting and communicating a position of the sensor on the examination surface, relative to a directly preceding position or in absolute terms, in relation to at least one fixed reference point. In principle, it is conceivable for the position sensors to be embodied analogously to one another. It is likewise conceivable for the position sensors to be provided for detecting the position data on the basis of different modes of functioning. By way of example, the position sensor can be embodied as a position sensor that measures in absolute terms, and the further position sensor can be embodied as a position sensor that measures in relative terms. The position sensors can also have a different spatial resolution, that is to say that a coarsely measuring position sensor provides for example a reference point for a finely measuring position sensor.

In one advantageous configuration, the data source is embodied as a rotation sensor provided for detecting a rotation of the locating sensor. As a result, the evaluation unit can correct an assignment of the locating data to the position data for the map information on the basis of the data of the rotation sensor, as a result of which a particularly robustly usable locating system can be provided. In this context, a "rotation sensor" should be understood to mean, in particular, a sensor provided for detecting an angular position of the locating sensor, in particular an angular position with regard to a rotation about an axis perpendicular to the examination surface. For this purpose, the rotation sensor can detect the angular position of the locating sensor in relation to a gravitational field and/or to a magnetic field of Earth and/or can be provided for evaluating signals from ground-based signal transmitters and/or from satellites.

Furthermore, it is proposed that the data source is embodied as an acceleration sensor provided for detecting acceleration information of the locating sensor. As a result, it is possible to assess a quality of the locating data in relation to an acceleration of the locating sensor at a time of the detection thereof. Furthermore, the evaluation unit can perform a redundant position determination and a high reliability of the position assignment of the locating system can be achieved.

In one advantageous configuration, the data source is embodied as an external application. As a result, it is possible to provide an integration of the locating system into other systems and/or an interface for communicating the map information. The data of the locating system can be forwarded and evaluated further in a particularly simple manner. The evaluation unit and/or a display unit can be controlled and/or set via the external application. An operating concept, for example of a smartphone, can be used in an advantageous way. In this context, an "external application" should be understood to mean, in particular, application software for an external computing unit, for example of a computer, in particular of a portable computer or of a smartphone, which has at least one interface with the evaluation unit and/or the display unit for transmitting the map information and/or for transmitting control information. It is conceivable for the external application to be provided for representing the map information on a display unit of the external computing unit. It is furthermore conceivable for the external application to have software for further evaluation of the map information, for example image recognition software and/or modeling software.

Furthermore, it is proposed that the evaluation unit is provided for weighting at least part of the locating data upon generation and/or upon the modification of the map information. As a result, it is possible to use a redundancy by means of the data source in an advantageous way and to achieve a high quality of the map information. In this context, "weighting" should be understood to mean, in particular, that data for the generation and/or upon the modification of the map information are multiplied by a weighting factor. Preferably, the evaluation unit determines the weighting depending on a data quality determined by the evaluation of redundant data.

The weighting factor can also be zero, that is to say that data are disregarded for the map information, for example data classified as a measurement error.

Advantageously, the data source is embodied as a camera which captures an image of the examination surface in at least one operating state. As a result, for the user it is possible to provide orientation information for interpreting the map information and to achieve a high operating convenience of the locating system. Preferably, the evaluation unit is provided for integrating the image into the map information, i.e. in particular for referencing the image with regard to the position data and/or for compensating for distortions.

Advantageously, the data source comprises an image recognition module provided for providing structure data on the basis of the locating data of the locating sensor. As a result, for the user, it is possible to provide an interpretation aid and to achieve a high operating convenience of the locating system. Objects to be located can be recognized very reliably. In this context, an "image recognition module" should be understood to mean a computing module or a software module which is provided for interpreting structures in image data, that is to say for example for recognizing edges of objects to be located and for outputting them as graphical elements such as lines, for example. In principle, it is conceivable for the image recognition module to be integrated in the evaluation unit.

Advantageously, the data source comprises a modeling module provided for providing model data on the basis of the locating data of the locating sensor. As a result, for the user, it is possible to provide an interpretation aid and to achieve a high operating convenience of the locating system. A high information content about the objects to be located can be provided. In this context, a "modeling module" should be understood to mean a computing module or a software module which is provided for interpreting structures in image data, that is to say for example for recognizing elements of objects to be located, and preferably for proposing and/or adapting a three-dimensional model, and for outputting the latter as graphical elements such as a wire frame model, for example. It is conceivable for the modeling module to be integrated in the evaluation unit.

Furthermore, it is proposed that the locating system comprises at least one display unit provided for displaying at least one segment of the map information. As a result, a particularly flexible locating system can be provided. In this context, a "display unit" should be understood to mean, in particular, a unit which, for transmitting display data, is connected to the evaluation unit, comprising a planar display element provided for a pictorial display, for example a liquid crystal display, an LED display, a screen provided for some other suitable display technology, or a projector.

Preferably, the display unit is provided for representing gray-scale levels, particularly preferably for representing colors. It is also conceivable for the display to be embodied in a 3D-enabled fashion and to comprise means provided for giving a user a three-dimensional image impression. The display unit can be connected to the evaluation unit by means of data cables or wirelessly. It is conceivable for the evaluation unit to be integrated in the display unit and for the display unit to be provided, in particular, for converting locating data into a representation attribute for pictorial reproduction, such as, for example, into a gray-scale value level, a gray-scale value of a gray-scale value profile, a color value level, a color value of a color profile, a brightness level, a brightness value of a brightness profile, a saturation level or a saturation value of a saturation profile and/or a pattern and/or a symbol. In one configuration, the buffer memory can be integrated in the display unit, i.e. be embodied for example at least as part of a memory of the display unit. It is furthermore conceivable for the display unit to be embodied as part of the locating unit. It is likewise conceivable for the display unit to be embodied separately from the locating unit, and/or for the locating system to comprise a further display unit, embodied separately from the locating unit. The display units can be assigned to different locating sensors. It is furthermore conceivable for the locating system to comprise at least one interface to a display unit which is embodied as part of an external computing unit.

In one advantageous configuration, the display unit is provided for determining the displayed segment of the map information depending on the position data. As a result, a particularly flexibly usable locating system can be provided and objects to be located can be located particularly rapidly. Preferably, in an operating mode the display unit shifts or magnifies the displayed segment if the position data currently assigned to the locating sensor reach an edge region of the displayed segment. Preferably, the edge region has a width of 5%, preferably 10%, and particularly preferably 15%, of a total extent of the displayed segment.

In one advantageous configuration, the display unit is provided for scaling the map information depending on the position data. As a result, a particularly flexibly usable locating system can be provided, objects to be located can be located particularly rapidly and locating can be limited to a particularly relevant area. In this context, "scaling" should be understood to mean, in particular, that the display unit adapts an imaging scale and, in particular, magnifies and/or refines a resolution and makes smaller details visible. In this context, an "imaging scale" should be understood to mean a ratio of extents of the map information in the display element to extents of an assigned area of the examination surface. It is conceivable for the display unit to determine the imaging scale depending on all detected position data, or for the display unit to determine the imaging scale depending on position data detected last and to magnify the imaging scale if the user moves the locating unit in a restricted area of the examination surface. "Last" should be understood to mean within a definable, previous time interval, for example within the last 30 seconds in each case.

Advantageously, the display unit is provided for centering the displayed segment of the map information in relation to a position of the locating sensor. As a result, it is possible to provide a particularly intuitively usable locating system which advantageously supports an orientation of the user. In this context, "centering" should be understood to mean, in particular, dynamically centering, i.e. tracking a position of the locating sensor in a locating process.

Furthermore, it is proposed that the display unit is provided for scaling the represented segment of the map information depending on a movement speed and/or for varying a spatial resolution. As a result, a particularly flexibly usable locating system can be provided, objects to be located can be located particularly rapidly and locating can be limited to a particularly relevant area. Preferably, a small imaging scale corresponds to a high movement speed and the display unit displays a large area of the examination surface in the display element, while a large imaging scale corresponds to a low movement speed and the display unit displays a small area of the examination unit with a correspondingly higher and/or refined resolution.

Advantageously, the locating system comprises a display unit provided for projecting the map information onto the examination surface. As a result, it is possible to display an arrangement of the object to be located directly on the examination surface. Errors in the spatial assignment of the locating data by the user can be avoided. A high operating convenience can be achieved.

Advantageously, the position sensor comprises at least one camera. As a result, a particularly precise, absolute position determination that can be set up easily can be provided. In this context, a "camera" should be understood to mean a camera provided for continuously detecting image data. The "camera" can be embodied as an optical camera, as an infrared camera or as a camera for a different frequency range. Preferably, the camera is arranged in a positionally fixed manner relative to the examination surface, for example on a tripod, and is provided for detecting a position of the locating sensor on the examination surface. It is conceivable for the camera to comprise an individual optical unit or a plurality of optical units, and to be embodied for example as a stereo camera.

In one advantageous configuration, the locating system comprises at least one marking which is spatially fixed relative to the locating sensor and is provided for being detected by the position sensor. As a result, a precise, absolute position determination which can be set up easily can be provided. In this context, a "marking" should be understood to mean, in particular, an area which has a surface for detection by the position sensor, which surface is different than surroundings of the area. Preferably, the marking is provided for detection by an optical camera, an infrared camera or a camera for a different frequency range. Preferably, the surface of the marking has a different color than surroundings of the marking and/or reflection properties, corresponding to a frequency range in which the position sensor is sensitive. Particularly preferably, the locating system comprises a plurality of markings each provided for supplying position data if some of the markings are concealed for the position sensor at least occasionally during the locating process.

Furthermore, it is proposed that the evaluation unit is provided for outputting a warning signal depending on the position data. As a result, a locating process can be limited to a defined examination area in a particularly simple manner. Preferably, the evaluation unit has an examination area definable by the user and is provided for outputting a warning signal if the currently detected position data are arranged in an edge area of the examination area or are arranged outside the examination area.

In an advantageous manner, the evaluation unit is provided for outputting a warning signal depending on a movement speed of the locating sensor. As a result, a high data quality of the map information can be ensured. Preferably, the evaluation unit is provided for outputting a warning signal if the movement speed exceeds an upper threshold value. In principle, it is also conceivable for the evaluation unit to be provided for terminating the locating process and for indicating this to the user. In this context, an upper "threshold value" should be understood to mean, in particular, a value which is definable by the user or system-dictated and/or is determined during the measurement process by the evaluation unit on the basis of the quality of the locating data and below which a quality of the locating data is at least satisfactory.

Furthermore, it is proposed that the evaluation unit is provided for determining a locating direction of an object to be located relative to the locating sensor. As a result, the locating direction can be indicated to the user, that is to say that an area of the examination surface in which objects to be located are arranged can be examined in a targeted manner. It is possible to provide a locating system for a particularly efficient locating process. In this context, "determining" should be understood to mean, in particular, that the evaluation unit is provided for deriving the locating direction from detected locating data stored in the buffer memory, for example, by means of a calculation specification. It is also conceivable for the locating sensor itself to be provided for detecting the locating direction.

Furthermore, a hand-held locating unit is proposed, comprising a locating sensor of a locating system according to the disclosure.

As a result, a particularly user-friendly locating unit can be provided. In this context, a "locating unit" should be understood to mean, in particular, a unit with a housing which accommodates at least the locating sensor, the position sensor, the evaluation unit and the data source.

Furthermore, a hand-held locating unit is proposed, comprising a locating sensor and comprising a display unit of a locating system according to the disclosure. As a result, a particularly compact and flexibly usable locating unit can be provided. In this context, a "locating unit" should be understood to mean, in particular, a unit with a housing which accommodates at least the locating sensor, the position sensor, the evaluation unit and the display unit. Advantageously, such a locating unit also has at least one data source.

Furthermore, an evaluation unit of a locating system according to the disclosure is proposed. As a result, a particularly flexibly usable evaluation unit can be provided.

Furthermore, a method is proposed for locating objects to be located concealed below an examination surface, wherein an evaluation unit assigns locating data of a locating sensor to position data of a position sensor and determines and outputs at least two-dimensional map information and modifies the at least two-dimensional map information on the basis of data of a data source. As a result, a user can recognize objects to be located particularly simply and intuitively by interpreting the map information.

It is possible to provide a locating system which requires a particularly short training effort.

In this case, the locating system according to the disclosure is not intended to be restricted to the application and embodiment described above. In particular, the locating system according to the disclosure, in order to fulfill a mode of functioning described herein, can have a number of individual elements, components and units that deviates from a number mentioned herein.

BRIEF DESCRIPTION OF THE DRAWINGS

Further advantages will become apparent from the following description of the drawing. Three exemplary embodiments of the disclosure are illustrated in the drawing. The drawing and the description contain numerous features in combination. The person skilled in the art will expediently also consider the features individually and combine them to form expedient further combinations.

In the figures.

DETAILED DESCRIPTION

Figure 1:
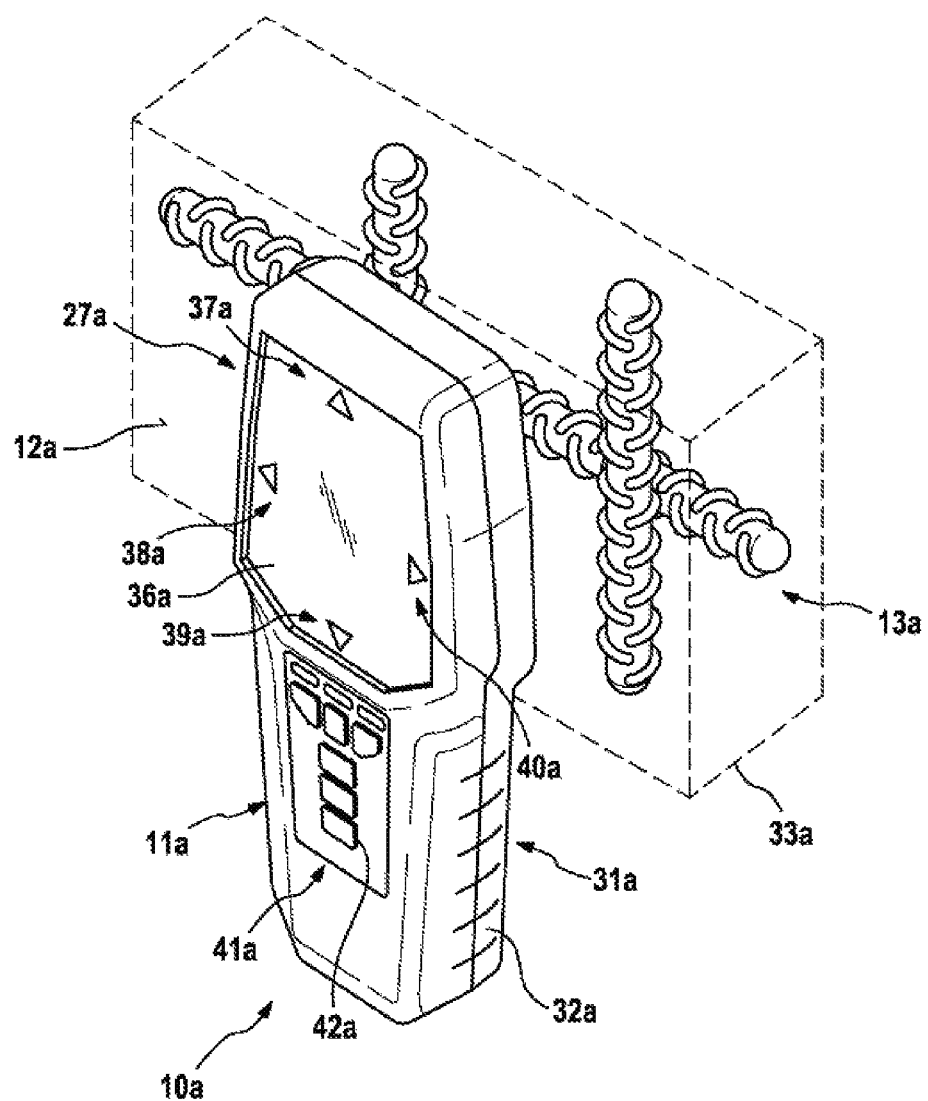
FIG. 1 shows a locating system according to the disclosure and a part of a building in a perspective view.

FIG. 1 shows a first locating system $10a$ according to the disclosure comprising a hand-held locating sensor $11a$ provided for detecting locating data concerning objects to be located $13a$ concealed below an examination surface $12a$. The locating system $10a$ comprises a locating unit $31a$, which comprises the locating sensor $11a$, and a housing $32a$, which holds and protects the locating sensor $11a$ in an assembled state. In the present exemplary embodiment, the locating sensor $11a$ is embodied as an inductive sensor and comprises a coil and an oscillator and is provided for detecting electromagnetic properties of a space arranged below the examination surface $12a$, such as, for example, an electrical conductivity or magnetic permeability or an electrical or magnetic susceptibility. The locating sensor $11a$ is provided for being guided manually over the examination surface $12a$, which is embodied as a surface of a part $33a$ of a building, for example as a surface of a building wall, of a building floor or of a building ceiling. An object to be located $13a$ arranged in an area below the examination surface $12a$, for example a reinforcement, a line, a pipe, an armor or a cavity, changes an electromagnetic field generated by the locating sensor $11a$ in comparison with an area that is free of such an object. The sensor is provided for detecting such a change in a continuous value range.

The locating system $10a$ comprises a position sensor $14a$ provided for detecting position data assignable to the locating data. In an assembled state, the housing $32a$ of the locating unit $31a$ holds and protects the position sensor $14a$.

The housing $32a$ holds the locating sensor $11a$ and the position sensor $14a$ in an at least substantially fixed relative position with respect to one another. In the present exemplary embodiment, the locating system $10a$ has a coordinate system provided as a reference system for the position data. The coordinate system is embodied as an orthogonal coordinate system. The position sensor $14a$ communicates the position data relative to an origin of the coordinate system. The locating system $10a$ is provided for assigning the origin of the coordinate system to a reference point on the examination surface $12a$ on the basis of a user input. In principle, it is also conceivable for the reference point to be arranged outside the examination surface $12a$. The position data form a position coordinate pair having an x-value and a y-value.

In the present exemplary embodiment, the position sensor $14a$ is embodied as an optical position sensor $14a$. The position sensor $14a$ comprises two laser light sources, the radiation directions of which are arranged perpendicular to one another in a plane parallel to the examination surface $12a$. The position sensor $14a$ is provided for determining a distance between the locating sensor $11a$ and further parts of the building, for example a building floor, a building ceiling or a building wall, from a determination of a phase angle from an emitted light beam with respect to a reflected light beam. In the present exemplary embodiment, the position sensor $14a$ is provided for determining a position of the locating sensor $11a$ in absolute terms, that is to say that a position determination is independent of a directly previously adopted position of the locating sensor $11a$. In principle, it is conceivable for the locating system $10a$ to comprise a plurality of reference points.

The locating system $10a$ comprises an evaluation unit $15a$ provided for determining two-dimensional map information from the locating data and the position data and for providing said two-dimensional map information. The evaluation unit $15a$ is connected to the locating sensor $11a$ and the position sensor $14a$ for communicating data and is provided for assigning the position data of the position sensor $14a$ to the locating data of the locating sensor $11a$ (cf. FIG. 2).

It is conceivable for the evaluation unit $15a$ to assign further data, for example a time of day, to the locating data. The two-dimensional map information is embodied as a large quantity of fields $44a$, $45a$, $46a$, $47a$, $48a$, $49a$. The fields $44a$, $45a$, $46a$, $47a$, $48a$, $49a$ are provided with reference signs by way of example in FIGS. 3 to 6. The two-dimensional map information has the structure of a matrix $43a$ having components arranged in rows and columns. A component of the matrix $43a$ corresponds to a field $44a$, $45a$, $46a$, $47a$, $48a$, $49a$ of the map information. Each output value is assigned to a field $44a$, $45a$, $46a$, $47a$, $48a$, $49a$. A field position is defined by a map coordinate pair having a map x-value and a map y-value. The evaluation unit $15a$ is provided for assigning the locating data to a respective field $44a$, $45a$, $46a$, $47a$, $48a$, $49a$ of the map information on the basis of the linking with the position data of the position sensor $14a$.

It is conceivable for the evaluation unit $15a$ to assign the locating data to exactly one field $44a$, $45a$, $46a$, $47a$, $48a$, $49a$ or to a plurality of fields $44a$, $45a$, $46a$, $47a$, $48a$, $49a$. It is also conceivable for a plurality of locating data to be assigned to a field $44a$, $45a$, $46a$, $47a$, $48a$, $49a$ and for the evaluation unit $15a$ to weight the locating data for this purpose. In principle, different expedient weightings are applicable, and the weightings can be embodied depending on the position data. In an operating mode, the evaluation unit $15a$ adapts an assignment of locating data to fields $44a$, $45a$, $46a$, $47a$, $48a$, $49a$ to a data density and refines in particular the assignment and thus a spatial resolution and improves the map information. In the case of a locating process in which the user passes over the examination surface 12a or an area of the examination surface 12a multiply with the locating unit 31a and, in particular, with the locating sensor 11a and the third data source 19a, embodied as a further locating sensor, a data density increases and the evaluation unit 15a refines the assignment of locating data to the fields 44a, 45a, 46a, 47a, 48a, 49a of the map information and increases and/or refines a spatial resolution of the map information. In an operating mode, the evaluation unit 15a determines from the locating data a depth of the objects to be located 13a, which corresponds to a distance between the objects to be located 13a and the examination surface 12a. In principle, it is conceivable for the locating sensor 11a to be provided for directly detecting the depth of the objects to be located 13a and communicating it to the evaluation unit 15a.

In an operating mode, the evaluation unit 15a assigns the locating data, i.e. inductance values of the locating sensor 11a, directly to the fields 44a, 45a, 46a, 47a, 48a, 49a of the two-dimensional map information by means of the position data. In principle, the locating data, depending on the type of sensor, can also reproduce a different physical and/or chemical variable, such as, for example, a voltage, a current intensity, a propagation time difference or a phase angle. It is also conceivable for the evaluation unit 15a to combine, i.e. fuse, locating data from locating sensors of different types in the operating mode.

In the present exemplary embodiment, the output values of the map information have a color value of a discrete color scale. The evaluation unit 15a determines the color value for an identification of areas which contain an object to be located 13a concealed below the examination surface 12a.

In a locating process, a matrix 43a of the map information has fields 44a, 45a without measurement values, fields 46a, 47a corresponding to an average measurement values, and fields 48a, 49a corresponding to high measurement values. In FIGS. 3 to 6, by way of example fields 44a, 45a, 46a, 47a, 48a, 49a are provided with reference signs. In an operating mode, the evaluation unit 15a assigns different color values to different levels of locating data and identifies fields 44a, 45a without a measurement value of the locating sensor 11a and/or having a measurement value of zero with a first color value, fields 46a, 47a having one of average measurement values by a further color value, and fields 48a, 49a having one of high measurement values by a third color value. In principle, it is also conceivable for the map information to have color values of a continuous or a quasi-continuous color scale.

Furthermore, the output values have a brightness value for displaying the depth of the objects to be located 13a. In this case, a low brightness value corresponds to a large depth, for example; in this case, a high brightness value corresponds to a small depth. The evaluation unit 15a is provided for dynamically adapting a scale of the color values and a scale of the brightness values depending on a value range of the locating data in a predefined spatial area. In principle, it is conceivable for the evaluation unit 15a to be provided for selection of the color scale and/or brightness scale by a user and for the user also to be able to set an assignment of the scales to object features.

Figure 2:
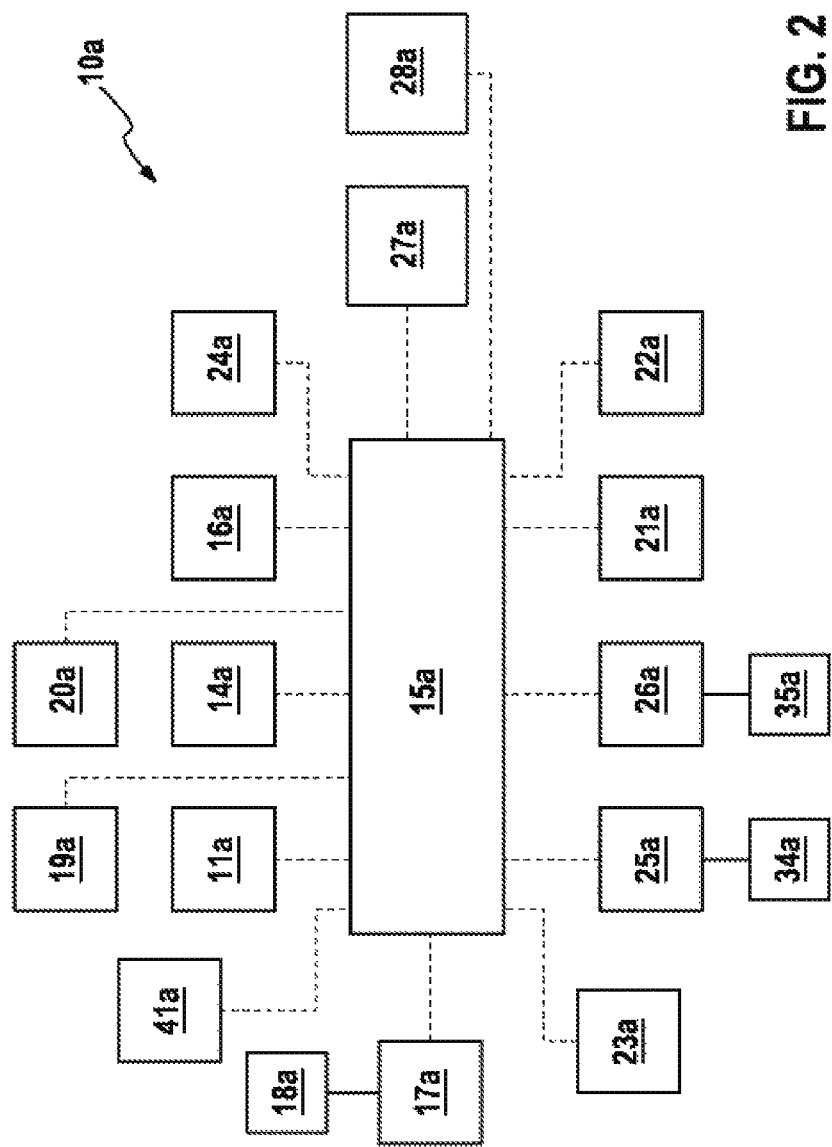
FIG. 2 shows a schematic illustration of units of the locating system and their connections.
Figure 3:
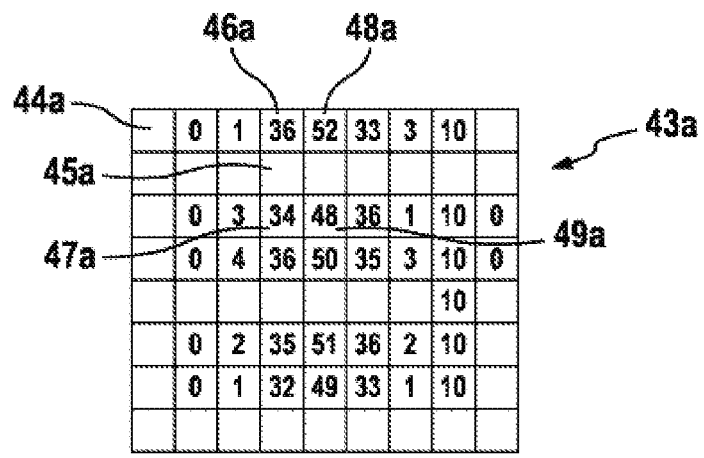
FIG. 3 shows a schematic drawing regarding the establishment of two-dimensional map information with sensor measurement values.
Figure 4:
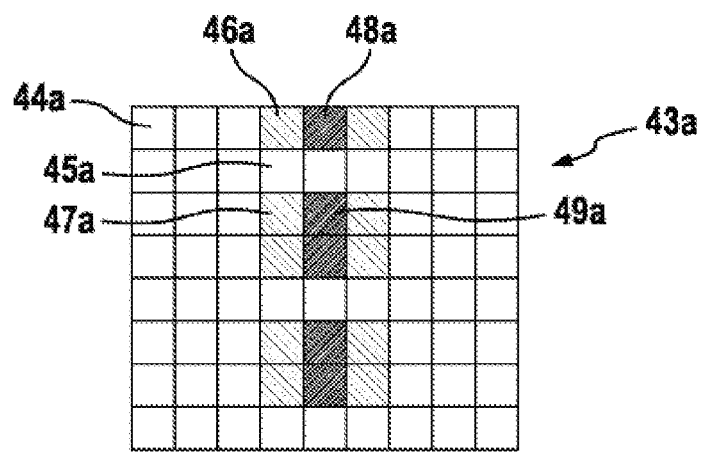
FIG. 4 shows a schematic drawing regarding the establishment of the two-dimensional map information in a display.
Figure 5:
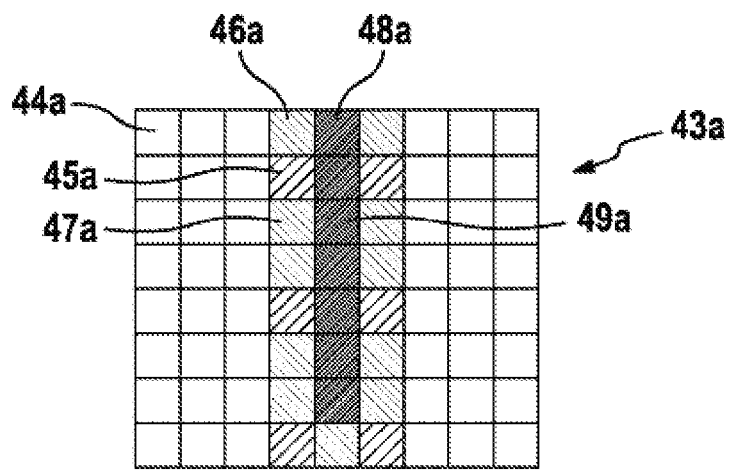
FIG. 5 shows a schematic drawing regarding the establishment of the two-dimensional map information after an interpolation step.

The locating system 10a in accordance with the exemplary embodiment in FIG. 1 comprises a plurality of data sources 16a, 17a, 19a, 20a, 21a, 22a, 23a, 24a, 25a, 26a provided for providing data concerning a modification of the map information (cf. FIG. 2). A first of the data sources 16a of the locating system 10a is embodied as a timer and clock generator. The first data source 16a is provided for providing data concerning a modification of the map information. The data source 16a is provided for communicating a time of day and a timing clock to the evaluation unit 15a. In principle, it is conceivable for the data source 16a to be embodied as an interface to a service from which a time of day and a timing clock are retrievable. The evaluation unit 15a is provided for modifying the map information on the basis of the data of the data source 16a.

The evaluation unit 15a is provided for determining and providing the map information in real time. In an operating state, the evaluation unit 15a processes in each case the data of the locating sensor 11a and of the position sensor 14a serially in the order in which they are detected by the locating sensor 11a and the position sensor 14a. A processing rate can give the user the impression that locating data for an area passed over by the locating sensor 11a are directly assigned and provided as map information. A data rate of locating data and position data which is processed by the evaluation unit 15a is adapted to a processing speed of the evaluation unit 15a, that is to say that data which cannot be processed directly by the evaluation unit 15a are disregarded.

Another of the data sources 17a comprises a buffer memory 18a for the locating data, the position data, and also for the assignment of the locating data to the position data. The buffer memory 18a is provided for storing the locating data, the position data and also the assignment of the locating data to the position data in a retrievable manner. The evaluation unit 15a is provided for storing the locating data, the position data and the assignment of the locating data to the position data in the buffer memory 18a. It is conceivable for the buffer memory 18a to be provided for additionally storing in a retrievable manner a point in time at which the locating data were detected, and for the evaluation unit 15a to be provided for storing in the buffer memory 18a, together with the locating data, the point in time at which the locating data were received. The evaluation unit 15a is provided for supplementing and updating the data stored in the buffer memory 18a, and in particular for increasing and/or refining a spatial resolution of the data.

The evaluation unit 15a is provided for interpolating the locating data. The evaluation unit 15a is provided for providing interpolated two-dimensional map information, i.e. for providing interpolation data at least for a portion of the fields 44a, 45a, 46a, 47a, 48a, 49a of the two-dimensional map information, in particular for fields 44a, 45a, without locating data. In a locating process, the locating sensor 11a communicates current locating data to the evaluation unit 15a and the position sensor 14a communicates current position data to the evaluation unit 15a. The evaluation unit 15a assigns the locating data to the position data, determines a current field 45a, and in an operating mode interrogates the buffer memory 18a for locating data which are assigned to fields 46a, 47a in surroundings of the current field 45a. The evaluation unit 15a weights the current locating data and the locating data from the buffer memory 18a and thus determines an interpolation value for the current field 45a. In principle, various expedient weightings are applicable. It is conceivable for the locating data from the buffer memory 18a to be disregarded for the determination of the output value for the current position data. The evaluation unit 15a spatially interpolates locating data from surroundings of a field 44a, 45a, 46a, 47a, 48a, 49a, which are stored in the buffer memory 18a, in order to determine an interpolation value and for this purpose weights the locating data from surroundings of the field 44a, 45a, 46a, 47a, 48a, 49a. In principle, various expedient weightings are applicable. The evaluation unit 15a generates output values for points in surroundings of current position data by means of interpolation.

Figure 6:
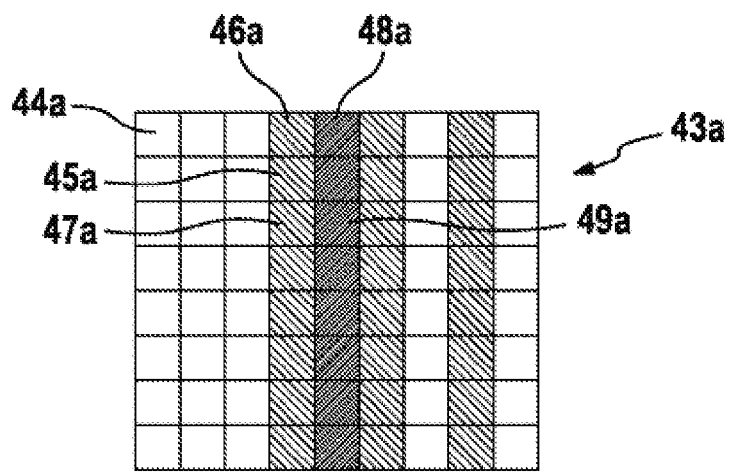
FIG. 6 shows a schematic drawing regarding the establishment of the two-dimensional map information after a contrast enhancement step.

The evaluation unit 15a comprises a data improvement module (not illustrated in more specific detail) and is provided for enhancing a contrast of the two-dimensional map information, for example for varying a color value of fields 46a, 47a to which average measurement values of the locating sensor 11a are assigned, and for making structures of the map information recognizable. FIG. 6 shows contrast-enhanced two-dimensional map information in which a vertically running structure 50a and a further vertically running structure 51a become recognizable.

The evaluation unit 15a is provided for updating an area of the map information in the case of renewed locating of objects to be located 13a which are assigned to the area of the map information, and for improving said area, in particular by means of a higher spatial resolution. The evaluation unit 15a checks, for current locating data and position data, whether the buffer memory 18a contains a corresponding data set having an identical position coordinate pair from a previous measurement. If that is the case, the evaluation unit 15a reads the locating data found from the buffer memory 18a and includes them in a calculation of the output values and in this case uses a weighting of the current locating data relative to the data stored in the buffer memory 18a. In principle, various expedient weightings are applicable.

It is conceivable for the buffer memory 18a to store each detected locating datum, or for the buffer memory 18a to store a limited number of locating data relative to a position coordinate pair, or for the buffer memory 18a to store only an averaged value of the locating data assigned to the position coordinate pair. In principle, it is conceivable for the locating system 10a to comprise a permanent memory provided for receiving data stored in the buffer memory 18a and making them available for a subsequent locating process. It is conceivable for the permanent memory and the buffer memory 18a to be embodied as a single memory. In an operating mode, the evaluation unit 15a compares current locating data with respect to current position data with locating data which are stored in the buffer memory 18a and which are assigned to neighboring position data, and determines therefrom the depth of the objects to be located 13a and/or improves a value for the depth that was determined from the locating data alone and was stored in the buffer memory 18a.

A third of the data sources 19a is embodied as a further locating sensor. The third data source 19a is provided for providing data concerning a modification of the map information. In the present exemplary embodiment, the third data source 19a is embodied as an AC sensor and provided for detecting signals brought about by an AC voltage, such as proceed from voltage-carrying objects to be located 13a. The third data source 19a is connected to the evaluation unit 15a for data communication. In an operating mode, the evaluation unit 15a combines the data of the locating sensors 11a, fuses the data and modifies the two-dimensional map information, that is to say that it assigns further representation attributes for example to one or more fields of the map information. In principle, it is conceivable for the third data source 19a to be embodied as an inductive sensor analogously to the locating sensor 11a and to be provided for detecting electromagnetic properties of objects to be located 13a concealed below the examination surface 12a, such as, for example, an electrical conductivity or magnetic permeability and/or an electrical or magnetic susceptibility. In an assembled state, the housing 32a of the locating unit 31a holds and protects the third data source 19a. The housing 32a holds the locating sensor 11a and the position sensor 14a and the third data source 19a in an at least substantially fixed relative position with respect to one another. The position sensor 14a is provided for determining a position of the locating sensor 11a and of the third data source 19a.

The evaluation unit 15a is provided for evaluating the data of the third data source 19a and for modifying the map information. In an operating state, the third data source 19a communicates the detected data to the evaluation unit 15a. The evaluation unit 15a assigns the data to the current position data of the position sensor 14a. The evaluation unit 15a compares the locating data of the locating sensor 11a and the data—embodied as locating data—of the third data source 19a and determines a consistent output value therefrom. The evaluation unit 15a assesses the locating data of the locating sensor 11a and of the third data source 19a with regard to disturbances of the measurement and resultant measurement errors and excludes locating data that were assessed as erroneous in the determination and modification of the map information.

In an operating mode, the evaluation unit 15a furthermore determines, on the basis of the locating data and the data of the third data source 19a, the depth of the objects to be located 13a and/or improves a value for the depth which was determined from the locating data of the locating sensor 11a alone or from the locating data of the locating sensor 11a and data of the buffer memory 18a. In principle, it is conceivable for the evaluation unit 15a to be provided for determining further properties of objects to be located 13a from the data of the third data source 19a and for integrating them into the map information, for example a material property or a current intensity in the case of conductors through which current flows.

The evaluation unit 15a is provided for determining a locating direction of an object to be located 13a relative to the locating sensor 11a. The evaluation unit 15a is provided for comparing the locating data of the locating sensor 11a, the locating data of the third data source 19a, embodied as a further locating sensor, and the data of the buffer memory 18a and for determining the locating direction of the object to be located 13a relative to the locating sensor 11a. Also conceivable is an operating mode in which the evaluation unit 15a compares the data of two data sources, for example of the locating sensor 11a and of the third data source 19a, embodied as a further locating sensor, and determines the locating direction of the object to be located 13a. Furthermore, it is conceivable for the locating sensor 11a to be provided for detecting the locating direction of the object to be located 13a relative to the locating sensor 11a and for communicating locating direction data to the evaluation unit 15a. In an operating mode, the evaluation unit 15a evaluates the locating direction data detected by the locating sensor 11a.

A fourth of the data sources 20a is embodied as a further position sensor. The fourth data source 20a is provided for providing data concerning a modification of the two-dimensional map information. In the present exemplary embodiment, the fourth data source 20a and the position sensor 14a are embodied analogously to one another, that is to say that the fourth data source 20a is provided for determining a position of the locating sensor 11a and of the third data source 20a embodied as a further locating sensor. In an assembled state, the housing 32a of the locating unit 31a holds and protects the fourth data source 20a. The housing 32a holds the locating sensor 11a and the position sensor 14a and the two data sources 19a, 20a in an at least substantially fixed relative position with respect to one another. The fourth data source 20a is provided for providing data concerning a modification of the map information. In principle, it is conceivable for the fourth data source 20a to be embodied as a position sensor provided for determining a position of the locating sensor 11a and of the third data source 19a embodied as a further locating sensor 11a in relative terms, i.e. relative to a previous position. It is furthermore conceivable for the fourth data source 20a to have a higher resolution in comparison with the position sensor 14a and for the evaluation unit 15a, in an operating mode, by means of the data of the fourth data source 20a, to refine a position determination of the locating sensor 11a and of the third data source 19a embodied as a further locating sensor, for example depending on the movement speed and/or the acceleration of the movement of the locating unit 31a along the examination surface 12a.

The evaluation unit 15a is provided for evaluating the data of the further data source 20a and for modifying the map information. In an operating state, the further data source 20a communicates the detected data to the evaluation unit 15a. The evaluation unit 15a assigns the data of the locating sensor 11a and of the third data source 19a embodied as a further locating sensor to the current position data of the position sensor 14a and of the further data source 19a embodied as a further position sensor. The evaluation unit 15a compares the position data of the position sensor 14a and the data of the further data source 20a and determines a consistent output value therefrom. The evaluation unit 15a assesses the data of the position sensor 14a and of the further data source 20a, recognizes whether data with high probability have a large measurement error and masks out erroneous data, i.e. excludes them from the generation or modification of the map information. In a configuration in which the further data source 20a has a higher resolution, the evaluation unit 15a makes the data of the position sensor 14a more precise. It is conceivable that the evaluation unit 15a to determine by means of the position data of the position sensor 14a an absolute position of the locating sensor 11a and of the data source 19a embodied as a locating sensor a reference position, and that the evaluation unit 15a evaluates the data of the fourth data source 19a for a more accurate determination of the position of the locating sensor 11a and of the third data source 19a.

The evaluation unit 15a is provided for determining, from the position data of the position sensor 14a and the data of the fourth data source 20a, an angular position of the hand-held locating unit 31a, of the locating sensor 11a and of the third data source 19a embodied as a further locating sensor on the basis of a rotation about an axis perpendicular to the examination surface 12a and for including it in the assignment of the locating data to position data.

A fifth of the data sources 21a is embodied as a rotation sensor. In the present exemplary embodiment, the rotation sensor is provided for detecting an angular position of the locating sensor 11a relative to a magnetic field of Earth. The fifth data source 21a is provided for providing data concerning a modification of the two-dimensional map information.

The data of the fifth data source 21a describe an angular position of the hand-held locating unit 31a and of the locating sensor 11a and of the third data source 19a embodied as a locating sensor, which indicates a rotation about an axis arranged perpendicular to the examination surface 12a.

The evaluation unit 15a is provided for modifying the two-dimensional map information on the basis of the data of the fifth data source 21a. In an operating mode, the fifth data source 21a communicates the angular position to the evaluation unit 15a and the evaluation unit 15a includes the data of the fifth data source 21a in the assignment of the locating data to the position data. In a configuration of the locating system 10a with a rotation sensor, it is conceivable to omit an evaluation of the position data and of the data of the further data source 20a embodied as a further position sensor 14a for the determination of an angular position of the hand-held locating unit 31a by the evaluation unit 15a. It is also conceivable for the evaluation unit 15a to compare with one another the results of a determination of the angular position by means of the fifth data source 21a and a determination of the angular position by means of the position data and the data of the fourth data source 20a embodied as a further position sensor and to correct the data.

A sixth of the data sources 22a is embodied as an acceleration sensor. In the present exemplary embodiment, the sixth data source 22a is embodied as a mass-inertia-based acceleration sensor. The sixth data source 22a is provided for providing data concerning a modification of the two-dimensional map information. The evaluation unit 15a is provided for modifying the two-dimensional map information on the basis of the data of the sixth data source 22a. In an operating mode, the sixth data source 22a communicates acceleration data to the evaluation unit 15a. The evaluation unit 15a integrates the acceleration data and determines a movement speed and position data. The evaluation unit 15a assigns the acceleration data and the movement speed to the locating data and assesses a quality of the locating data, which decreases with increasing acceleration and increasing movement speed. The evaluation unit 15a modifies in the output values a weighting and/or uncertainty for locating data which were assigned to a high acceleration and/or to a high movement speed. The evaluation unit 15a provides the output data with an attribute for the acceleration, the movement speed and/or the quality.

It is conceivable for the attribute to be embodied as a representation attribute such as, for example, a contrast value, a gray-scale value, a color value, a color saturation or a brightness. Uncertain data in the two-dimensional map information then appear gray, for example. The user can then judge which areas of the examination surface 12a will be passed over one more time with the locating unit 31a, for example if a higher data quality is required in specific areas. The user passes over areas of the examination surface 12a if appropriate one more time or a plurality of times and the locating system 10a supplements, densifies and/or improves the two-dimensional map information and the display of the map information; in particular, in an operating mode, the locating system 10a increases and/or refines the spatial resolution of the map information and/or of the display unit 27a.

The evaluation unit 15a is provided for outputting a warning signal depending on a movement speed of the locating sensor 11a. The evaluation unit 15a is provided for outputting a warning signal if an accuracy and/or reliability of the locating data fall(s) below a predefined and/or predefinable value on account of an excessively high acceleration and/or on account of an excessively high movement speed. In the present exemplary embodiment, the locating system 10a comprises a signal element which is connected to the evaluation unit 15a for the purpose of communicating the warning signal and is provided for indicating the warning signal to the user. In the present exemplary embodiment, the signal element is embodied as an acoustic signal element. In principle, it is also conceivable for the signal element to be embodied as an optical signal element or vibration element or to be provided for outputting some other expedient signal.

The evaluation unit 15a is provided for excluding at least a portion of the locating data upon generation or upon the modification of the map information. The locating sensor 11a and the third data source 19a embodied as a further locating sensor communicate locating data to the evaluation unit 15a in an operating mode. The evaluation unit 15a compares the locating data reciprocally and with a value range that can be expected. The evaluation unit 15a has an assessment specification that provides a value for a data quality for example depending on a deviation of the locating data among one another or depending on a comparison of the locating data with a value range that can be expected. The assessment specification furthermore takes account of data of the position sensor 14a and data of the fourth data source 20a embodied as a further position sensor, and also the data of the sixth data source 22a embodied as an acceleration sensor, and checks whether the locating data can be reliably assigned to position data. The evaluation unit 15a excludes locating data upon generation or upon a modification of the map information, depending on the determined data quality, and locating data which are not reliably assignable to position data.

A seventh of the data sources 24a is embodied as a camera which captures an image of the examination surface 12a at least in an operating state. In the present exemplary embodiment, the camera is embodied as an electronic, optical camera. The seventh data source 24a is provided for providing data concerning a modification of the two-dimensional map information. The evaluation unit 15a is provided for modifying the two-dimensional map information on the basis of the data of the seventh data source 24a.

In an operating mode, the seventh data source 24a continuously communicates the image of the examination surface 12a to the evaluation unit 15a. The evaluation unit 15a integrates the image into the two-dimensional map information and superimposes the locating data with the image. For this purpose, the evaluation unit 15a references the image data in relation to the position data of the position sensor 14a. The locating system 10a is provided for assigning a pixel of the camera or a plurality of pixels to the reference point or the plurality of reference points for the position sensor 14a on the basis of user inputs. The evaluation unit 15a is provided for evaluating the assignment of the pixels to the reference points of the position sensor 14a for a scaling and a referencing of the locating data in relation to the image of the seventh data source 24a embodied as a camera.

An eighth of the data sources 25a comprises an image recognition module 34a. The image recognition module 34a is provided for providing model data on the basis of the locating data of the locating sensor 11a. In an operating state, the image recognition module 34a evaluates locating data stored in the buffer memory 18a and extracts structural properties of the locating data. By way of example, the image recognition module 34a interprets differences in the values along a line as an object edge. The image recognition module 34a provides geometrical object data which can correspond to objects to be located 13a or boundaries of objects to be located 13a and communicates the geometrical object data to the evaluation unit 15a. The evaluation unit 15a is provided for superimposing the geometrical object data with the locating data and thus modifying the map representation.

A ninth of the data sources 26a comprises a modeling module 35a. The modeling module 35a is provided for providing model data on the basis of the locating data of the locating sensor 11a. In an operating state, the modeling module 35a evaluates locating data stored in the buffer memory 18a and reconstructs structures and/or surfaces of objects to be located 13a which correspond to the locating data. In an operating mode, the modeling module 35a derives depth information from the locating data. It is conceivable for the modeling module 35a to have a set of basic object shapes and to compare the basic object shapes with the locating data and to select a basic object shape having a best correspondence.

In this case, the modeling module 35a improves a correspondence of the basic object shapes with the locating data by a scaling, rotation, shift and/or some other expedient geometrical operation. The modeling module 35a provides model data which correspond to objects to be located 13a or surfaces of objects to be located 13a, and communicates the model data to the evaluation unit 15a. In an operating mode, the modeling module 35a classifies the objects to be located 13a according to material; in particular, the modeling module 35a differentiates cavities from filled spaces, metallic from nonmetallic objects to be located 13a and voltageless from voltage-carrying objects to be located 13a. In principle, it is conceivable for the modeling module 35a to be provided for further classifications, for example on the basis of further materials, a water content or other criteria. The evaluation unit 15a is provided for superimposing the model data with the locating data and for modifying the map information. The evaluation unit 15a modifies the map information on the basis of the model data for classification and represents for example metallic objects to be located 13a red, electrical lines, in particular 50 Hz lines, green and further objects to be located 13a blue.

In principle, it is also conceivable for the evaluation unit 15a to represent the model data for classification by means of patterns and/or symbols.

The locating system 10a comprises a display unit 27a provided for displaying a segment of the two-dimensional map information. The display unit 27a is connected to the evaluation unit 15a for communicating the map information. It is provided for displaying the map information to scale. The display unit 27a is furthermore provided for displaying the entire two-dimensional map information in an operating state. The display unit 27a comprises a display element 36a for the map information. In the present exemplary embodiment, the display element 36a is embodied as a color-enabled OLED display. The display unit 27a is embodied as a part of the locating unit 31a and is fixedly connected to the housing 32a of the locating unit 31a. The evaluation unit 15a is connected to the display unit 27a for communicating output values. In principle, it is conceivable for the display unit 27a to be embodied separately from the locating unit 31a and to be connected via a wireless connection for communicating output values, for example via a point-to-point ad hoc connection. The displayed segment has an imaging scale corresponding to a ratio of extents of the map information in the display element 36a to extents of an assigned area of the examination surface 12a. The imaging scale has an identical imaging scale for a first dimension and for a second dimension. The display unit 27a is provided for displaying the locating direction of the object to be located 13a relative to the locating sensor 11a, said locating direction being determined by the display unit 27a. In the present exemplary embodiment, the display element 36a for the map information has four areas 37a, 38a, 39a, 40a provided for a display of the locating direction. In principle, it is also conceivable for the display unit 27a to comprise further display elements for displaying the locating direction, which are embodied separately from the display element 36a for the map information.

The evaluation unit 15a is provided for outputting a warning signal depending on the position data. In an operating mode, the evaluation unit 15a outputs a first warning signal if the position data are arranged in an edge region of the displayed segment. The edge region has a width of 10 percent of a total extent of the displayed segment. In principle, the width can also have some other expedient value. In an operating mode, the evaluation unit 15a outputs a further warning signal, which is different than the first warning signal in its type, if the current position data are arranged outside the displayed segment. The locating system 10a comprises a signal element which is connected to the evaluation unit 15a for communicating the warning signals and is provided for indicating the warning signals to the user. In the present exemplary embodiment, the signal element is embodied as an acoustic signal element. In principle, it is also conceivable for the signal element to be embodied as an optical signal element or vibration element or to be provided for outputting some other expedient signal. Furthermore, it is conceivable for the evaluation unit 15a to be provided for providing direction information that indicates to the user in what direction positions of the displayed segment lie relative to the current position data. The direction information supports the user in guiding the locating unit 31a into that area of the examination surface 12a which corresponds to the displayed segment.

The display unit 27a is provided for determining the represented segment of the map information depending on the position data. In an operating mode, the display unit 27a determines for each coordinate value limits of a value range of detected position data, i.e. a minimum and a maximum of the detected x-coordinate values, and a minimum and a maximum of the detected y-coordinate values. The value range of detected position data varies dynamically on account of the movement of the locating unit 31a over the examination surface 12a. In the operating mode, the displayed segment has a fixed imaging scale indicating a ratio of a length of a section on the examination surface 12a to a length of an image of the section in the displayed segment. The display unit 27a shifts the displayed segment in a direction corresponding to a movement direction of the locating unit 31a, and displays last detected and assigned locating data within the segment. The display unit 27a shifts the displayed segment if last detected position data are arranged in an edge region of the displayed segment. In an operating mode, the display unit 27a dynamically shifts the displayed segment and centers a position of the locating sensor 11a in the displayed segment.

The display unit 27a is provided for scaling the displayed segment of the map information. The display unit 27a is provided for scaling the displayed segment depending on the position data. The display unit 27a has an operating mode in which the displayed segment encompasses an entire range of detected position data. The display unit 27a adapts the scaling in the operating mode, that is to say that the display unit 27a reduces the imaging scale and the displayed segment corresponds to a larger area of the examination surface 12a.

In a further operating mode, the display unit 27a has a time interval which limits a quantity of position data used for a determination of the displayed segment. In the further operating mode, only position data which were detected in the time interval proceeding from a current point in time are taken into account for the value range. In a locating process in which in the time interval the locating sensor 11a is arranged within a small area of the examination surface 12a, the display unit 27a increases the imaging scale and the displayed segment corresponds to a smaller area of the examination surface 12a. The display unit 27a increases and/or refines a resolution of the displayed segment and shows more details of an area of the examination surface 12a which corresponds to the displayed segment. The user controls the resolution of the displayed segment via an extent of a travel movement.

The display unit 27a is provided for scaling the represented segment of the map information depending on a movement speed. The display unit 27a has a calculation specification which indicates how the imaging scale results from the movement speed. In an operating mode, the display unit 27a determines the imaging scale depending on the movement speed. The display unit 27a determines a small imaging scale for a high movement speed and a large imaging scale for a low movement speed. For a low movement speed, the display unit 27a sets a large imaging scale and increases and/or refines a resolution of the displayed segment and shows more details of an area of the examination surface 12a which corresponds to the displayed segment. The user controls the resolution of the displayed segment via the movement speed.

The locating system 10a comprises a further display unit 28a, which is provided for projecting the map information onto the examination surface 12a. In the present exemplary embodiment, the further display unit 28a comprises a color-enabled projector. The locating system 10a is provided for assigning a projection point of the projector or a plurality of projection points to the reference point or the plurality of reference points for the position sensor 14a, on the basis of user inputs. The evaluation unit 15a is provided for evaluating the assignment of the projection points to the reference points of the position sensor 14a for a scaling and a referencing of the locating data in relation to the map information displayed by the projector. In principle, it is conceivable for the locating system 10a to comprise the further display unit 28a as the sole display unit 27a.

Figure 7:
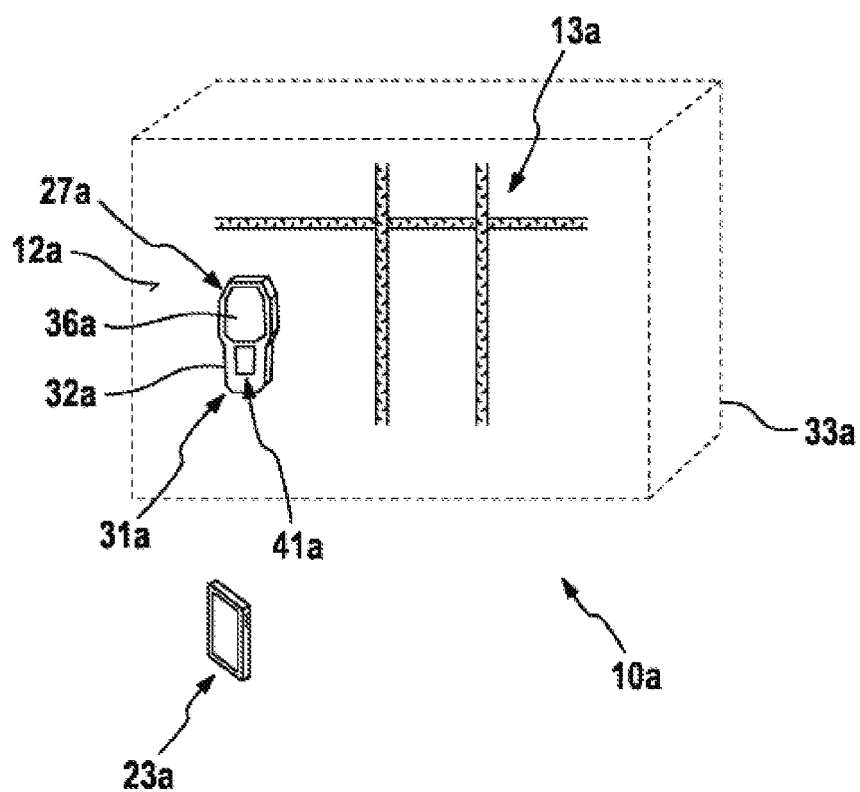
FIG. 7 shows a perspective view of the locating system with a data source.

A tenth of the data sources 23a is embodied as an external application. The tenth data source 23a is provided for providing data concerning a modification of the two-dimensional map representation. In the present exemplary embodiment, the tenth data source 23a is embodied as an application of a mobile computing unit, for example of a smartphone or of a portable computer (cf. FIG. 7). The tenth data source 23a is provided for communicating control data to the evaluation unit 15a, for example for determining the displayed segment, for a scaling, for defining display parameters, such as color scales, assignment of color scales, brightness or contrast. The tenth data source 23a is furthermore provided for communicating external data to the evaluation unit 15a, for example global position coordinates such as longitude and latitude and/or metadata for logging the locating process. The tenth data source 23a is connected to the evaluation unit 15a for data communication. The evaluation unit 15a is provided for modifying the two-dimensional map information on the basis of the data of the tenth data source 23a. In principle, it is conceivable for the mobile computing unit to comprise a display unit for the locating system 10a.

The locating unit 31a comprises an input unit 41a provided for user inputs. The input unit 41a is connected to the evaluation unit 15a for communicating the user inputs. The input unit 41a has a plurality of input elements 42a embodied as keys. The evaluation unit 15a is provided for evaluating the user inputs and adapting parameters for generation and modification of the map information, such as, for example, color scales, an assignment of the color scales, the imaging scale of the display unit 27a, a sensitivity of the locating sensor 11a and of the third data source 19a embodied as a locating sensor, threshold values of the image recognition module 34a and of the modeling module 35a, threshold values for the angular position of the locating unit 31a, the movement speed and the acceleration.

In a process for locating objects to be located 13a concealed below the examination surface 12a, the user moves the locating unit 31a with the locating sensor 11a and the position sensor 14a, and with the third data source 19a embodied as a further locating sensor and the fourth data source 20a embodied as a further position sensor, over the examination surface 12a. The locating sensor 11a detects locating data of the objects to be located 13a. Likewise, the third data source 19a embodied as a further locating sensor detects locating data. The locating sensor 11a and the third data source 19a communicate the locating data to the evaluation unit 15a. The position sensor 14a and the fourth data source 20a detect position data and communicate the latter to the evaluation unit 15a.

The evaluation unit 15a assigns the position data to the locating data, evaluates the locating data and determines a part of the two-dimensional map information. The further data sources 16a, 17a, 21a, 22a, 23a, 24a, 25a, 26a detect data and communicate the latter to the evaluation unit 15a. The evaluation unit 15a stores locating data, position data and data of the further data sources 16a, 17a, 21a, 22a, 23a, 24a, 25a, 26a in the buffer memory 18a. The evaluation unit 15a retrieves earlier detected locating data and data which were assigned to positions in surroundings of the current position of the locating sensor 11a from the buffer memory 18a, compares, checks and/or weights data and modifies the two-dimensional map information. The evaluation unit 15a communicates the map information to the display unit 27a. The display unit 27a checks the displayed segment and the scaling of the segment and adapts the segment and/or the scaling of the segment. The display unit 27a displays the segment of the modified map information. The user interprets the map information, identifies an arrangement of the objects to be located 13a on the basis of the modified map information, and/or identifies areas of the examination surface 12a for which the map information is inadequate, and continues the locating process for said areas. The evaluation unit 15a completes and improves the map information in the course of the locating process. The evaluation unit 15a adapts a spatial resolution of the locating data in relation to an assignment to position data for the map information. The display unit 27a adapts a spatial resolution in relation to the displayed segment.

FIGS. 8 to 12 show two further exemplary embodiments of the disclosure. The following descriptions are restricted essentially to the differences between the exemplary embodiments, wherein, with regard to components, features and functions remaining the same, reference may be made to the description of the other exemplary embodiments, in particular FIGS. 1 to 7. In order to differentiate the exemplary embodiments, the letter a in the reference signs of the exemplary embodiment in FIGS. 1 to 7 is replaced by the letters b and c in the reference signs of the exemplary embodiments in FIGS. 8 to 12. With regard to identically designated components, in particular with regard to components having identical reference signs, in principle reference may also be made to the drawings and/or the description of the other exemplary embodiments, in particular FIGS. 1 to 7. In particular, features and properties of the individual embodiments are also freely combinable and interchangeable with one another.

Figure 8:
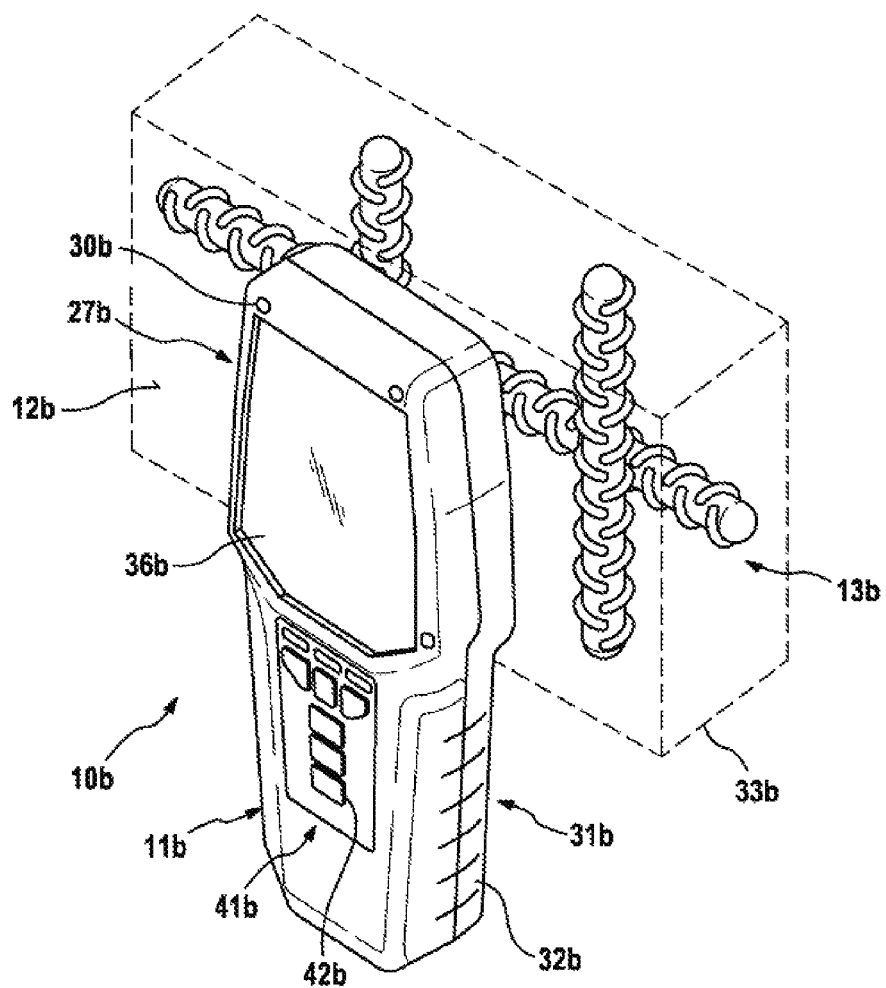
FIG. 8 shows a further exemplary embodiment of the locating system according to the disclosure in a perspective view.
Figure 9:
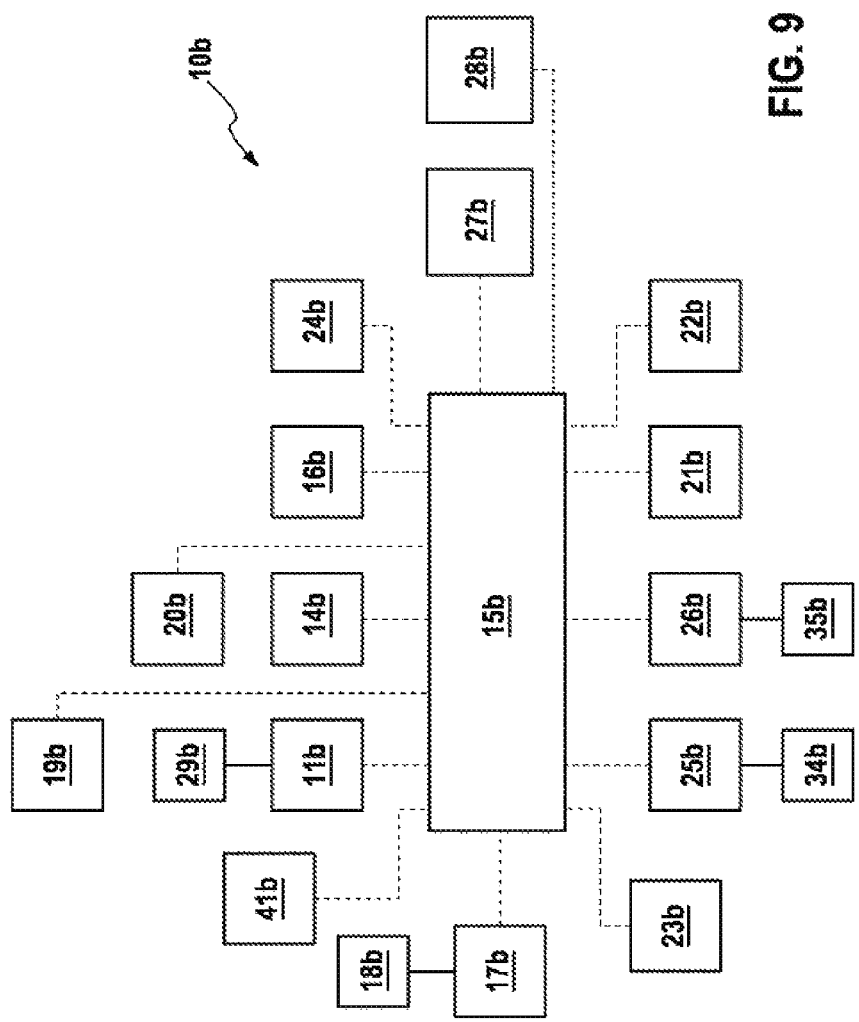
FIG. 9 shows a schematic illustration of units of the locating system for the further exemplary embodiment.
Figure 10:
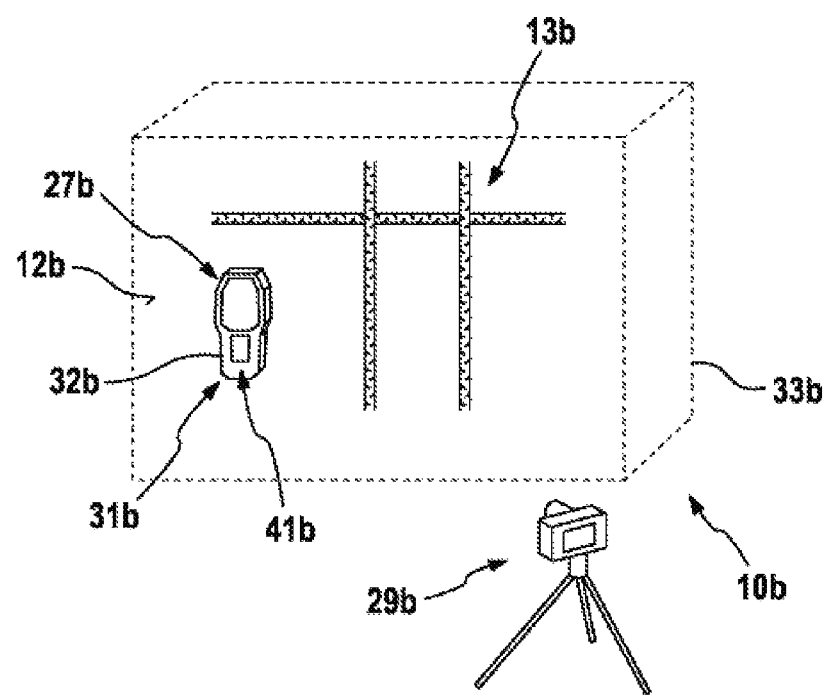
FIG. 10 shows a perspective view for the further exemplary embodiment with a camera.

In a further exemplary embodiment, the locating system 10b comprises, analogously to the previous exemplary embodiment, a hand-held locating sensor 11b provided for detecting locating data concerning objects to be located 13b concealed below an examination surface 12b, furthermore a position sensor 14b provided for detecting position data assignable to the locating data (cf. FIG. 8). The locating system 10b furthermore comprises an evaluation unit 15b provided for determining two-dimensional map information from the locating data and the position data and for providing said two-dimensional map information. The locating system 10b comprises a locating unit 31b comprising the locating sensor 11b, and a housing 32b, which holds and protects the locating sensor 11b in an assembled state. The locating sensor 11b is provided for being guided manually over the examination surface 12b, which is embodied as a surface of a part 33b of a building, for example as a surface of a building wall, a building floor or a building ceiling. The locating system 10b comprises a plurality of data sources 16b, 17b, 19b, 20b, 21b, 22b, 23b, 24b, 25b, 26b provided for providing data concerning a modification of the map information (cf. FIG. 9). Analogously to the previous exemplary embodiment, one of the data sources 17b of the locating system 10b comprises a buffer memory 18b for the locating data, the position data, and for the assignment of the locating data to the position data. The buffer memory 18b is provided for storing the locating data, the position data, and the assignment of the locating data to the position data, in a retrievable manner. Another of the data sources 25b comprises an image recognition module 34b. The image recognition module 34b is provided for providing model data on the basis of the locating data of the locating sensor 11b. A third of the data sources 26b comprises a modeling module 35b. The modeling module 35b is provided for providing model data on the basis of the locating data of the locating sensor 11b.

In contrast to the previous exemplary embodiment, the position sensor 14b comprises a camera 29b. The camera 29b is embodied separately from the locating unit 31b as an optical camera 29b, and is provided for continuously providing image data (cf. FIG. 10). In an operating state, the camera 29b provides image data of the examination surface 12b. The position sensor 14b furthermore comprises an image processing unit provided for determining a position of the locating sensor 11b on the examination surface 12b by means of the image data. The camera 29b is connected to the image processing unit for communicating the image data. In an operating mode, the image processing unit evaluates the image data of the camera 29b and determines position data assignable to the locating data. The image processing unit is connected to the evaluation unit 15b for communicating the position data. It is conceivable for the image processing unit to be connected to the evaluation unit 15b by means of a wireless data connection.

The locating system 10b comprises a plurality of markings 30b which are spatially fixed relative to the locating sensor 11b and are provided for being detected by the position sensor 14b. In the present exemplary embodiment, the markings 30b are embodied as part of the locating unit 31b. The markings 30b are embodied as reflector laminae. The markings 30b are arranged fixedly on the housing 32b of the locating unit 31b.

The locating system 10b comprises a display unit 27b provided for displaying a segment of the two-dimensional map information.

The display unit 27b is connected to the evaluation unit 15b for communicating the map information. It is provided for displaying the map information to scale. The display unit 27b comprises a display element 36b for the map information. The locating system 10b comprises a further display unit 28b provided for projecting the map information onto the examination surface 12b. In the present exemplary embodiment, the further display unit 28b comprises a color-enabled projector.

The locating unit 31b comprises an input unit 41b provided for user inputs. The input unit 41b is connected to the evaluation unit 15b for communicating the user inputs. The input unit 41b has a plurality of input elements 42b embodied as keys. The evaluation unit 15b is provided for evaluating the user inputs and adapting parameters for generation and modification of the map information, such as, for example, color scales, an assignment of the color scales, the imaging scale of the display unit 27b, a sensitivity of the locating sensor 11b, threshold values of the image recognition module 34b and of the modeling module 35b, threshold values for the angular position of the locating unit 31b, the movement speed and the acceleration.

Figure 11:
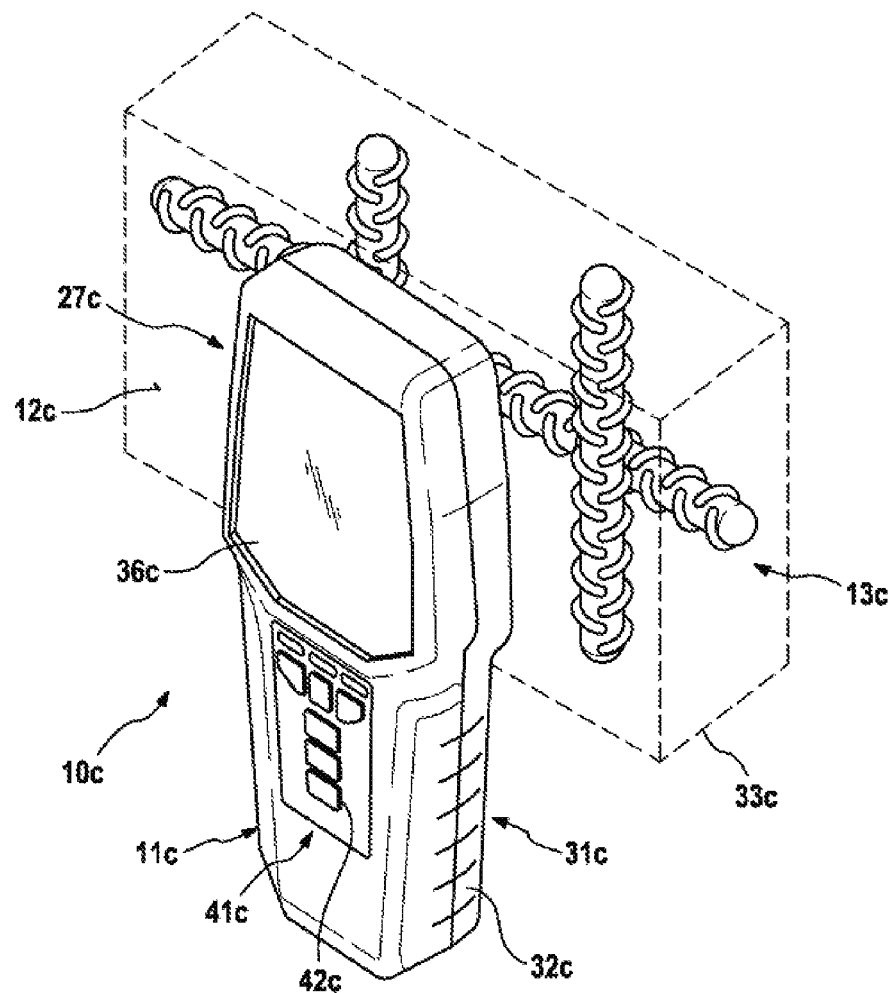
FIG. 11 shows a third exemplary embodiment of the locating system according to the disclosure in a perspective view.
Figure 12:
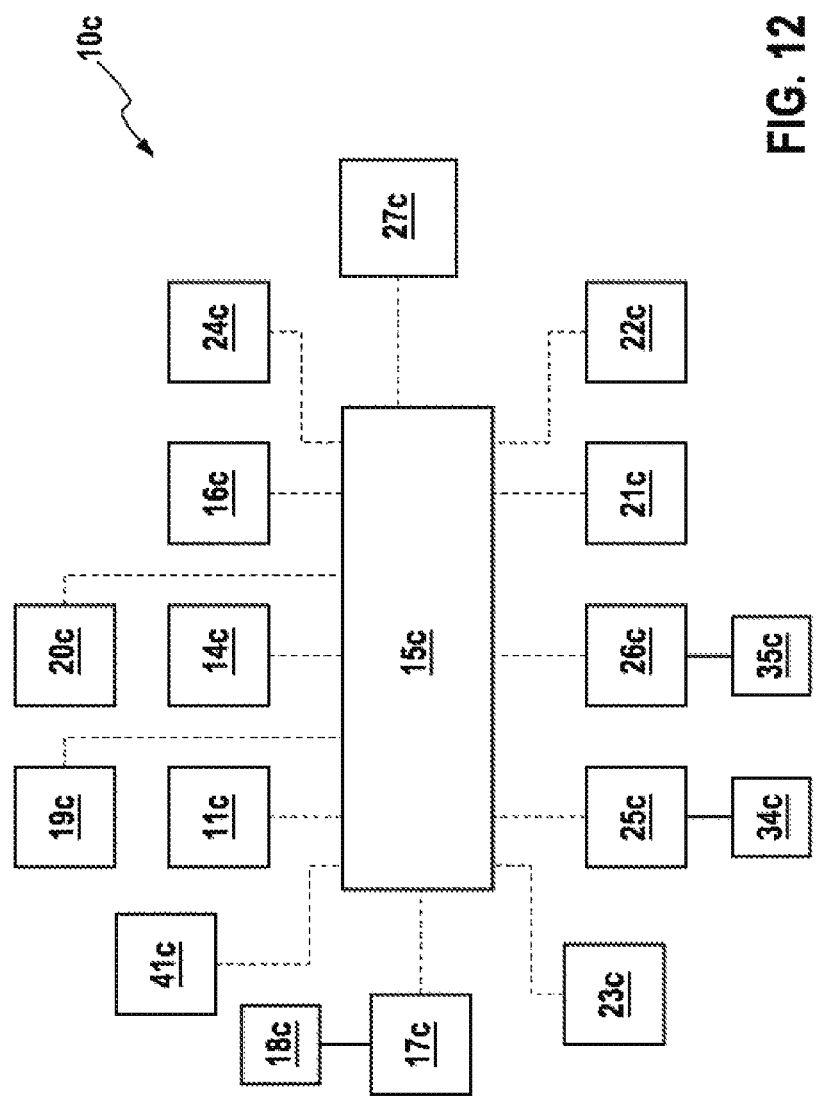
FIG. 12 shows a schematic illustration of units of the locating system for the third exemplary embodiment.

In a further exemplary embodiment, the locating system 10c comprises, analogously to the previous exemplary embodiment, a hand-held locating sensor 11c provided for detecting locating data concerning objects to be located 13c concealed below an examination surface 12c, furthermore a position sensor 14c provided for detecting position data assignable to the locating data (cf. FIG. 11). In contrast to the previous exemplary embodiments, the locating system 10c furthermore comprises an evaluation unit 15c provided for determining three-dimensional map information from the locating data and the position data and for providing said three-dimensional map information. A first dimension and a second dimension extend parallel to the examination surface 12c; a third dimension extends perpendicular to the examination surface 12c and corresponds to a depth of the objects to be located 13c, i.e. a distance between the objects to be located 13c and the examination surface 12c. The evaluation unit 15c is provided for determining the depth of the objects to be located 13c from the locating data. In principle, it is also conceivable for the locating sensor 11c to be provided for directly detecting the depth of the objects to be located 13c and for communicating it to the evaluation unit 15c.

The locating system 10c comprises a locating unit 31c comprising the locating sensor 11c, and a housing 32c, which holds and protects the locating sensor 11c in an assembled state. The locating sensor 11c is provided for being guided manually over the examination surface 12c, which is embodied as a surface of a part 33c of a building, for example as a surface of a building wall, a building floor or a building ceiling. The locating system 10c comprises a plurality of data sources 16c, 17c, 19c, 20c, 21c, 22c, 23c, 24c, 25c, 26c provided for providing data concerning a modification of the map information (cf. FIG. 12). Analogously to the previous exemplary embodiment, one of the data sources 17c of the locating system 10c comprises a buffer memory 18c for the locating data, the position data, and for the assignment of the locating data to the position data. The buffer memory 18c is provided for storing the locating data, the position data, and the assignment of the locating data to the position data, in a retrievable manner. Another of the data sources 25c comprises an image recognition module 34c. The image recognition module 34c is provided for providing model data on the basis of the locating data of the locating sensor 11c. A third of the data sources 26c comprises a modeling module 35c. The modeling module 35c is provided for providing model data on the basis of the locating data of the locating sensor 11c.

Analogously to the previous exemplary embodiment, one of the data sources 17c of the locating system 10c comprises a buffer memory 18c for the locating data, the position data, and for the assignment of the locating data to the position data. The buffer memory 18c is provided for storing the locating data, the position data, and the assignment of the locating data to the position data, in a retrievable manner. In an operating mode, the evaluation unit 15c compares current locating data with respect to current position data with locating data which are stored in the buffer memory 18c and which are assigned to neighboring position data, and determines therefrom the depth of the objects to be located 13c and/or improves a value for the depth which was determined from the locating data alone and was stored in the buffer memory 18c.

Another of the data sources 19c is embodied as a further locating sensor. The further data source 19c is provided for providing data concerning a modification of the three-dimensional map information. The further data source 19c is embodied as an inductive sensor analogously to the locating sensor and is provided for detecting electromagnetic properties of objects concealed below the examination surface, such as, for example, an electrical conductivity or magnetic permeability and/or an electrical or magnetic susceptibility. In principle, it is conceivable for the locating sensor to be embodied as an electromagnetic sensor of a different type or to be provided for locating according to a different physico-chemical principle, for example for determining a substance concentration. The position sensor 14c is provided for determining a position of the locating sensor 11c and of the further data source 19c.

In an operating mode, the evaluation unit furthermore determines, on the basis of the locating data and the data of the further data source 19c, the depth of the objects to be located 13c and/or improves a value for the depth which was determined from the locating data of the locating sensor 11c alone or from the locating data of the locating sensor and data of the buffer memory 18c. In principle, it is conceivable for the evaluation unit 15c to be provided for determining further properties of objects to be located 13c from the data of the further data source 19c and for integrating them into the map information.

A third of the data sources 25c comprises an image recognition module 34c. The image recognition module 34c is provided for providing model data on the basis of the locating data of the locating sensor 11c. A fourth of the data sources 26c comprises a modeling module 35c. The modeling module 35c is provided for providing model data on the basis of the locating data of the locating sensor 11c.

The locating system 10c comprises a 3D-enabled display unit 27c provided for displaying a segment of the three-dimensional map information. The display unit 27c is connected to the evaluation unit 15c for communicating the three-dimensional map information. The display unit 27c comprises a 3D-enabled display element 36c. In the present exemplary embodiment, the display element 36c is embodied as a color-enabled 3D OLED display. The display unit 27c is embodied as part of the locating unit 31c and is fixedly connected to the housing 32c of the locating unit 31c. The evaluation unit 15c is connected to the display unit 27c for communicating output values. The displayed segment has an imaging scale corresponding to a ratio of extents of the displayed segment to extents of an assigned area of the examination surface 12c and the depth. The imaging scale has an identical imaging scale for the first dimension and the second dimension, and a further imaging scale for the third dimension. In principle, it is also conceivable for the display unit 27c to be embodied separately from the locating unit 31c and to be connected wirelessly to the evaluation unit 15c for communicating the map information. The display unit 27c can for example be embodied as a 3D-enabled monitor or comprise a projector and a display surface and elements for viewing such as, for example, spectacles and/or shutter devices.

The locating unit 31c comprises an input unit 41c provided for user inputs. The input unit 41c is connected to the evaluation unit 15c for communicating the user inputs. The input unit 41c has a plurality of input elements 42c embodied as keys. The evaluation unit 15c is provided for evaluating the user inputs and adapting parameters for generation and modification of the map information, such as, for example, color scales, an assignment of the color scales, the imaging scale of the display unit 27c, a sensitivity of the locating sensor 11c, threshold values of the image recognition module 34c and of the modeling module 35c, threshold values for the angular position of the locating unit 31c, the movement speed and the acceleration.

The locating system according to the disclosure is not restricted to the concrete embodiments shown. In particular, features and properties of the individual embodiments are freely combinable and interchangeable with one another.

The invention claimed is:

1. A locating system comprising:
   at least one hand-held locating sensor configured to detect locating data concerning objects concealed below an examination surface, the at least one hand-held locating sensor including a position sensor configured to detect position data assignable to the locating data;
   at least one display unit; and
   an evaluation unit operably connected to the at least one hand-held locating sensor and to the at least one display unit, the evaluation unit configured to:
   determine at least two-dimensional map information based on the locating data and the position data; and
   operate the at least one display unit to display at least one segment of the at least two-dimensional map information such that at least one of (i) the at least one segment of the map at least two-dimensional information is centered in relation to a position of the at least one hand-held locating sensor, (ii) the at least one segment of the at least two-dimensional map information is scaled depending on the position data, and (iii) the at least one segment of the at least two-dimensional map information is scaled depending on a movement speed of the at least one hand-held locating sensor.

2. The locating system as claimed in claim 1, further comprising:
   at least one data source configured to provide additional data,
   wherein the evaluation unit is configured to modify the at least two-dimensional map information based on the additional data from the data source.

3. The locating system as claimed in claim 2, wherein the at least one data source has a buffer memory configured to store at least the locating data.

4. The locating system at least as claimed in claim 3, wherein the evaluation unit is configured to at least one of update and refine an area of the at least two-dimensional map information in a case of a renewed locating of the objects which are assigned to the area of the at least two-dimensional map information.

5. The locating system as claimed in claim 2, wherein the at least one data source is embodied as at least one of (i) a further locating sensor, (ii) a further position sensor, (iii) a rotation sensor configured to detect a rotation of the at least one hand-held locating sensor, (iv) an acceleration sensor configured to detect acceleration information of the at least one hand-held locating sensor, (v) an external application, and (vi) a camera configured to capture an image of the examination surface in at least one operating state.

6. The locating system as claimed in claim 2, wherein the evaluation unit is configured to exclude at least part of the locating data at least one of upon generation of the at least two-dimensional map information and upon modification of the at least two-dimensional map information.

7. The locating system as claimed in claim 2, wherein the at least one data source comprises at least one of (i) an image recognition module configured to provide structure data based on the locating data and (ii) a modeling module configured to provide model data based on the locating data.

8. The locating system as claimed in claim 1, wherein the at least one hand-held locating sensor is configured to move freely along the examination surface.

9. The locating system as claimed in claim 1, wherein the evaluation unit is configured to determine the at least two-dimensional map information in real time.

10. The locating system as claimed in claim 1, wherein the evaluation unit is configured to determined the at least two-dimensional map information as three-dimensional map information.

11. The locating system as claimed in claim 1, wherein the evaluation unit is configured to at least one of interpolate and extrapolate the locating data.

12. The locating system as claimed in claim 1, wherein:
   in a first operating mode, the displayed at least one segment of the at least two-dimensional map information is scaled so as to encompass an entire detected range of the position data; and
   in a second operating mode, the displayed at least one segment of the at least two-dimensional map information has a imaging scale such that the displayed at least one segment of the at least two-dimensional map information corresponds to a larger area of the examination surface compared to the first operating mode.

13. The locating system as claimed in claim 1, wherein the at least one display unit is configured to determine the displayed at least one segment of the at least two-dimensional map information depending on the position data.

14. The locating system as claimed in claim 1, wherein:
   in response to the movement speed being in a first range of movement speeds, the displayed at least one segment of the at least two-dimensional map information has a first imaging scale; and
   in response to the movement speed being in a second range of movement speeds, the displayed at least one segment of the at least two-dimensional map information has a second imaging scale, wherein the first range of movement speeds is faster than the second range of movement speeds and the first imaging scale is smaller than the second imaging scale.

15. The locating system at least as claimed in claim 1, wherein the at least one display unit is configured to project the map at least two-dimensional information onto the examination surface.

16. The locating system as claimed in claim 1, wherein the position sensor comprises at least one camera.

17. The locating system as claimed in claim 1, further comprising:
    at least one marking which is spatially fixed relative to the at least one hand-held locating sensor, the position sensor being configured to detect the at least one marking.

18. The locating system as claimed in claim 1, wherein the evaluation unit is configured to output a warning signal depending on at least one of (i) the position data and (ii) a movement speed of the at least one hand-held locating sensor.

19. The locating system as claimed in claim 1, wherein the evaluation unit is configured to determine a locating direction of one of the objects relative to the at least one hand-held locating sensor.

20. A method for locating objects concealed below an examination surface, the method comprising:
    assigning, with an evaluation unit, locating data from a locating sensor to position data from a position sensor of the locating sensor;
    determining, with the evaluation unit, at least two-dimensional map information based on the locating data and the position data;
    outputting, with the evaluation unit, the at least two-dimensional map information; and
    modifying, with the evaluation unit, the at least two-dimensional map information based on additional data from a data source.

* * * * *